US009616343B2

(12) United States Patent
van Linden

(10) Patent No.: US 9,616,343 B2
(45) Date of Patent: Apr. 11, 2017

(54) HYBRID GAMING PLATFORM

(71) Applicant: Gaming Support B.V., Rotterdam (NL)

(72) Inventor: Lucien Maurice van Linden, Maasland (NL)

(73) Assignee: GAMING SUPPORT B.V., Rotterdam (NL)

( * ) Notice: Subject to any disclaimer, the term of this patent is extended or adjusted under 35 U.S.C. 154(b) by 241 days.

(21) Appl. No.: 14/546,920

(22) Filed: Nov. 18, 2014

(65) Prior Publication Data
US 2015/0141156 A1    May 21, 2015

Related U.S. Application Data

(60) Provisional application No. 61/905,791, filed on Nov. 18, 2013.

(51) Int. Cl.
*G06F 17/00* (2006.01)
*A63F 13/77* (2014.01)
*A63F 13/90* (2014.01)
*A63F 13/24* (2014.01)
*G07F 17/32* (2006.01)

(52) U.S. Cl.
CPC .............. *A63F 13/77* (2014.09); *A63F 13/24* (2014.09); *A63F 13/90* (2014.09); *G07F 17/3202* (2013.01)

(58) Field of Classification Search
USPC ......................................... 463/16–25, 40–43
See application file for complete search history.

(56) References Cited

U.S. PATENT DOCUMENTS

| | | | | |
|---|---|---|---|---|
| 8,133,113 B2* | 3/2012 | Nguyen | ................... | G07F 17/32 463/16 |
| 2008/0318682 A1* | 12/2008 | Rofougaran | .......... | G01S 13/426 463/39 |
| 2015/0371484 A1* | 12/2015 | Arnone | ................... | G07F 17/32 463/25 |
| 2016/0055711 A1* | 2/2016 | Arnone | ................... | G07F 17/32 463/9 |

* cited by examiner

Primary Examiner — Ronald Laneau
(74) Attorney, Agent, or Firm — Howard & Howard Attorneys PLLC

(57) ABSTRACT

This disclosure provides a hybrid gaming platform for use with a controller and a plurality of game machine components. The hybrid gaming platform comprises a first system board and a second system board in communication with the first system board. The first system board is configured to receive a request through the at least one communication interface, detect a nonvolatile memory unit in the removable media reader interface, and transmit a game machine program and a verification code through the at least one communication interface. The second system board is configured to receive game signals as a function of the game machine program through that at least one communication interface and send one signal to at least one game component through at least one of the plurality of wired connections.

16 Claims, 54 Drawing Sheets

HYBRID GAMING PLATFORM

CROSS REFERENCE TO RELATED APPLICATIONS

This application claims the benefit of U.S. Provisional Application Ser. No. 61/905,791 titled HYBRID GAMING PLATFORM, filed on Nov. 18, 2013, the entirety of which is incorporated herein by reference.

COPYRIGHT NOTICE

A portion of this disclosure contains material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The present invention relates to gaming machines for the playing of games of chance and, more particularly, to systems and methods of verifying and installing game machines programs for active game play by users.

BACKGROUND OF THE DISCLOSURE

Gaming machines are a major component of the gaming industry. Traditionally, many gaming machines were designed from scratch in order to account for the particular game mechanics and payouts that applied to the game for which they were designed. This included custom cabinet designs, fixed system boards, and permanent mechanical reels. A major drawback of the custom and fixed game machine cabinets and systems is that they were fixed to one game exclusively. In order to change the game, a game machine operator would have to make major modifications to the game machine itself or replace the game machine altogether. This amounted to additional expense and delay in order to generate additional and different gaming experiences for patrons of a gaming resort or facility.

As electronic technologies continue to evolve, game machines have also evolved in order to allow for continued flexibility of cabinets and game systems. Such flexibility is useful in allowing players to interact with multiple systems on a game machine (i.e., loyalty programs) or to play multiple games with the same game machine cabinet. LCD displays and shifting mechanisms would be used in order to change the appearance and functionality of a game machine. While these newer systems allowed for increased variability, these systems generally involved more expensive display technologies and control systems in order to provide such variability.

It is an object of the present disclosure to address or at least ameliorate some of the above disadvantages.

SUMMARY OF THE DISCLOSURE

This disclosure provides a hybrid gaming platform for use with a controller and a plurality of game machine components. The platform comprises a first system board and a second system board in communication with the first system board. The first system board includes a removable media reader interface and a plurality of communication interfaces. One of the communication interfaces is connected to the controller. The second system board has at least one communication interface connected to the controller and a plurality of wired connections. Each wired connection is connected to at least one game machine component. The first system board is configured to receive a request through the at least one communication interface, detect a nonvolatile memory unit in the removable media reader interface, and transmit a game machine program and a verification code through the at least one communication interface. The second system board is configured to receive game signals as a function of the game machine program through that at least one communication interface and send one signal to at least one game component through at least one of the plurality of wired connections.

This disclosure also provides a method of using a hybrid gaming platform for use with a controller and a plurality of game machine components. The platform comprises a first system board and a second system board in communication with the first system board. The first system board includes a removable media reader interface and a plurality of communication interfaces. One of the communication interfaces is connected to the controller. The second system board has at least one communication interface connected to the controller and a plurality of wired connections. Each wired connection is connected to at least one game machine component. The method comprises the steps of: initiating, through the controller, a launcher program to read the presence of a game program located on a nonvolatile memory unit; verifying, through the removable media reader interface, the game program on a nonvolatile memory unit; verifying, through the at least one communication interface, the controller connected to the first system board; verifying, through the at least one communication interface, the connection of the first and second system board to the controller; copying the game program from the nonvolatile memory unit to the controller; initiating, through the controller, the game program; and verifying, through the controller, the initiation of the game program through the launcher program.

This disclosure also provides a non-transitory information recording medium containing a computer readable program that functions as a hybrid gaming platform for use with a controller and a plurality of game machine components. The platform comprises a first system board and a second system board in communication with the first system board. The first system board includes a removable media reader interface and a plurality of communication interfaces. One of the communication interfaces is connected to the controller. The second system board has at least one communication interface connected to the controller and a plurality of wired connections. Each wired connection is connected to at least one game machine component. The first system board is configured to receive a request through the at least one communication interface, detect a nonvolatile memory unit in the removable media reader interface, and transmit a game machine program and a verification code through the at least one communication interface. The second system board is configured to receive game signals as a function of the game machine program through that at least one communication interface and send one signal to at least one game component through at least one of the plurality of wired connections.

BRIEF DESCRIPTION OF THE DRAWINGS

Other advantages within the present disclosure will be readily appreciated as the same becomes better understood by reference to the following detailed description when considered in connection with the accompanying drawings:

FIG. 50 is a representative drawing of an interactive touchscreen display, according to an embodiment of the present invention;

FIG. 52 is a representative drawing of an interactive touchscreen display, according to an embodiment within the present disclosure;

FIG. 53 is a representative drawing of an interactive touchscreen display, according to an embodiment within the present disclosure.

Corresponding reference characters indicate corresponding parts throughout the drawings.

DETAILED DESCRIPTION OF THE DRAWINGS

Figure 1:
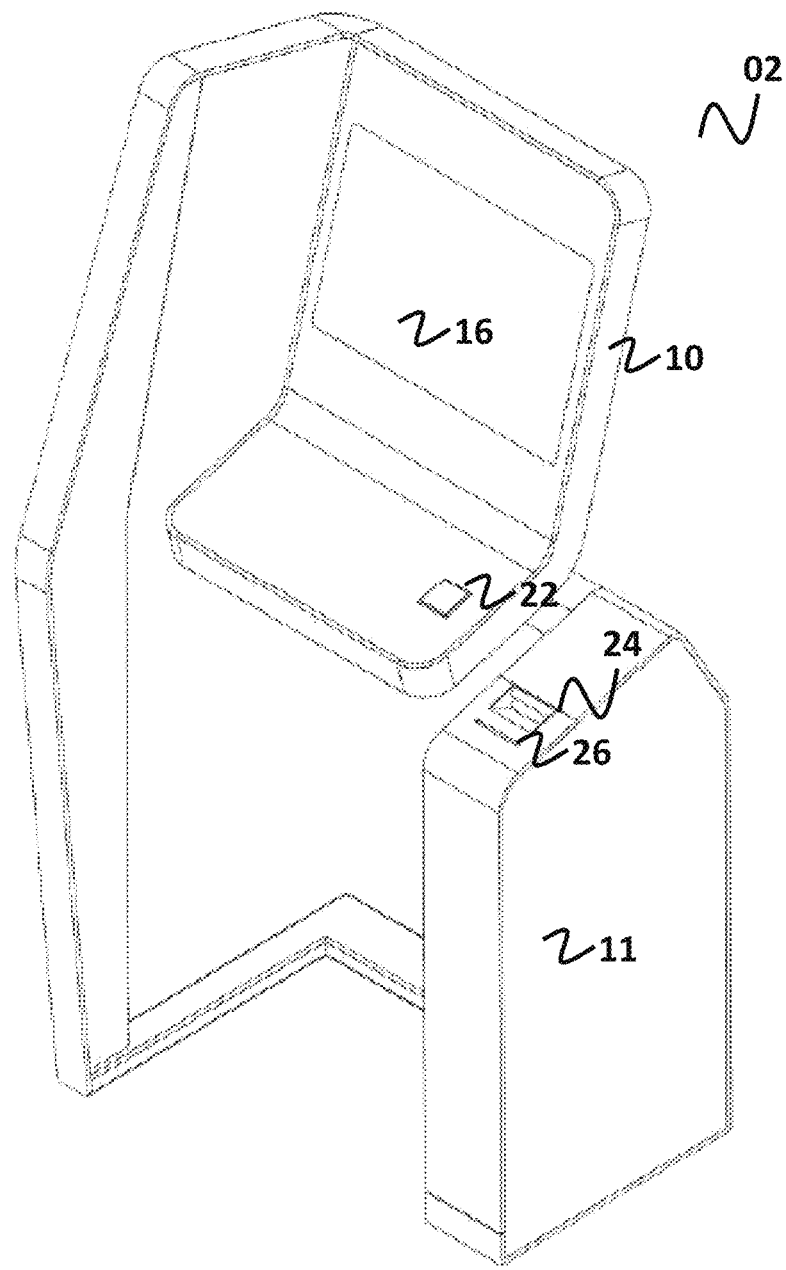
FIG. 1 is a perspective view of an exemplary cabinet assembly utilized in the present hybrid gaming platform.

With reference to the drawings and in operation, the present disclosure overcomes at least some of the disadvantages of known gaming machines by providing a Hybrid Gaming Device (HGD) and Hybrid Gaming Platform (HGP) (collectively the 'hybrid gaming platform') and method for use with a controller and a plurality of game machine components. The hybrid gaming platform forms a new way of offering games to players in casinos, gaming arcades and gaming parlors. The hybrid gaming platform is a new type of video slot machine which may be comprised completely of off shelf standard equipment. For example, the device can be built around a Mac Mini (or any similar small form factor desktop computer), an iPad (or any similar designed tablet computer or touch-based display), a ticket printer, bill acceptor, an accounting-systems interface, and some smaller parts like a service light and an OLED push button. The hybrid gaming platform allows for all of these components to work together and having a wager-based game installed and verified on the system for gameplay by a user. Furthermore, additional elements within the hybrid gaming platform allow for the operator of a system to adjust the settings of the hybrid gaming platform and further tailor the gaming experience.

Opposed to regular reel and video slots, the hybrid gaming platform is a standard device in which an unlimited number of games can be stored and played. Because of its standard components the cost price of the hybrid gaming platform can be kept to a minimum. For example, the iPad is used as a reconfigurable keyboard and statistics display. As a result approvals for separate games/cabinets are no longer necessary since the cabinet and its appearance no longer change when new game is programmed or uploaded.

Furthermore, the hybrid gaming platform incorporates a proprietary software platform that is designed for this device. The unit can work independently or in a server/workstation mode. The system of the invention is capable of splitting of a traditional electronic gaming machine to several off the shelf products, and creates a single platform that can operate and combine stand-alone, server-Based and online game operations into a single platform. The central process can be provided via a standard OSX based computer and an iOS tablet device used as dynamic and interactive user input device. This combination of a tablet and a desktop computer makes full use of standard products and their scalability. Gaming specific peripherals like ticket printers, bill acceptors, tower lights, dedicated gaming system connections etc. are realized via developed slot-machine interface boards and various additional gaming components.

It will be apparent to those skilled in the art from this disclosure that the following description of the embodiments of the present disclosure is provided for illustration only and not for the purpose of limiting the disclosure as defined by the appended claims and their equivalents. All references are expressly incorporated herein by reference in various non-limiting embodiments.

FIG. 1 is a perspective view of one embodiment of a cabinet assembly 10 used within hybrid gaming platform 02. FIGS. 2-36 provide additional perspectives of the hybrid gaming platform 02 as contained within the cabinet assembly 10.

A preferred embodiment of the hybrid gaming platform 02 is in the form of a game machine cabinet assembly 10 that allows for the verification and installation of game programs and game data for active gameplay by a user through stand-alone commercial computing components. In the illustrated embodiment, the hybrid gaming platform 02 includes a cabinet assembly 10. The cabinet assembly 10 stores a plurality of game machine components 14 necessary for the functionality of the hybrid gaming platform 02. In this embodiment, the cabinet assembly 10 includes a display 16, which is utilized by the hybrid gaming platform 02 in order to display the game program installation as the game functionality for a player. The display 16 may be an LCD display, but any comparable display technology may also be used. The display 16 may also be touch-enabled in order to increase the functionality of the system for the player. The cabinet assembly 10 also includes a plurality of lighting strips 18 (not included) incorporated throughout. The lighting strips 18 are incorporated into the hybrid gaming platform 02 and are used during gameplay as a function of the game machine program that is installed into the hybrid gaming platform 02.

The hybrid gaming platform 02 also includes a plurality of interactive gaming components 20. These interactive game machine components 20 allow for a player to interact with a game program once it installed and verified onto the hybrid gaming platform 02. Such interactive gaming components 20 can be directly connected with gameplay or associated with other components of the player's gaming experience with the hybrid gaming platform 02. Other interactive game machine components 20 allow for operators to work with the hybrid gaming platform 02 in order to provide diagnostic services. Some of the interactive game machine components shown include the play button switch 22, the bill acceptor 24, and the ticket printer 26. Additional interactive game machine components include the attendant key switch 28 (not shown) and the jackpot reset key switch 30 (not shown).

Figure 2:
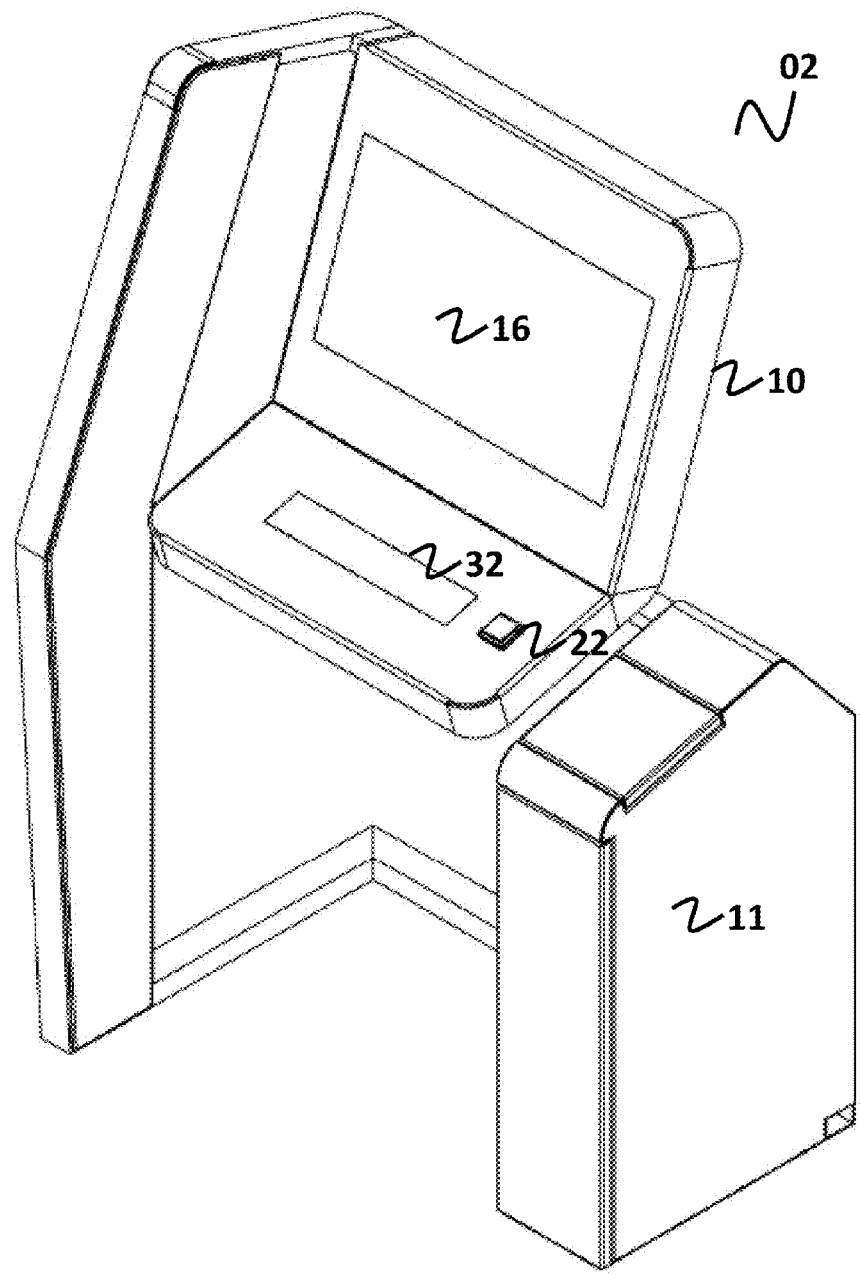
FIG. 2 is a perspective view of another embodiment of an exemplary cabinet assembly utilized in the present hybrid gaming platform.
Figure 3:
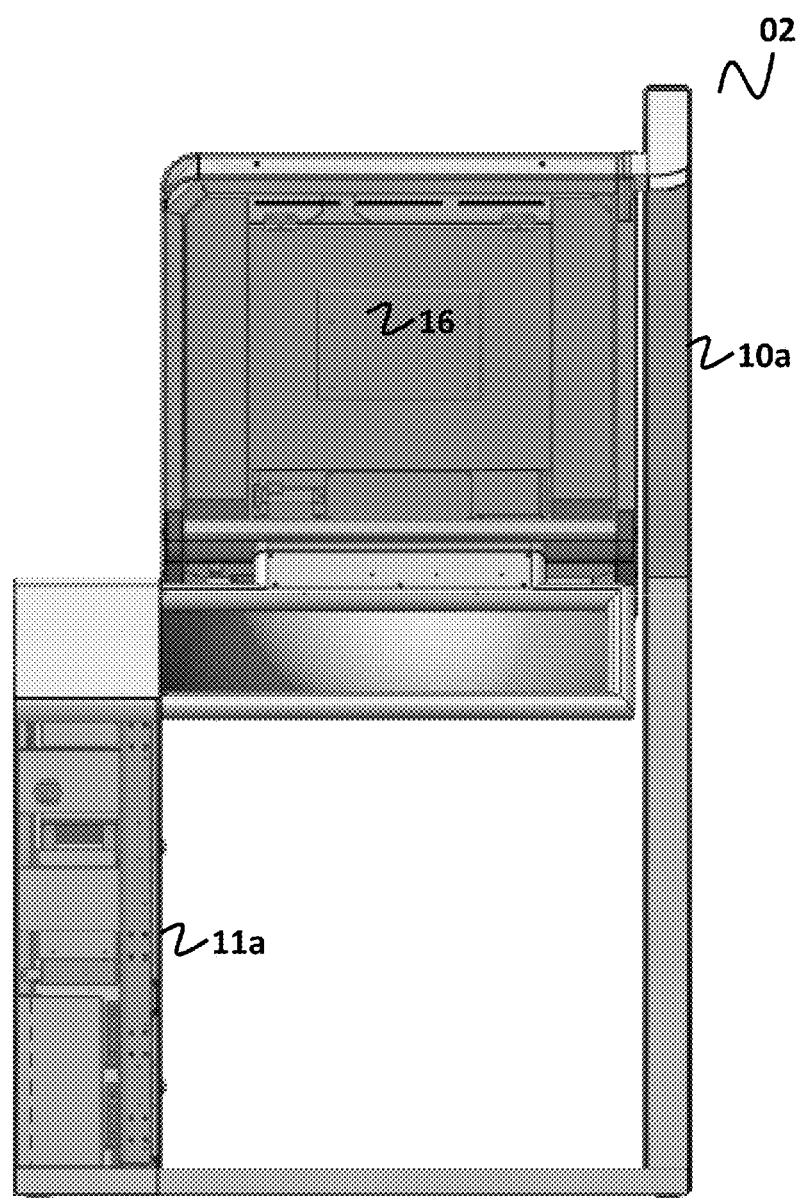
FIG. 3 is a rear perspective view of the exemplary cabinet assembly utilized in the present hybrid gaming platform.
Figure 4:
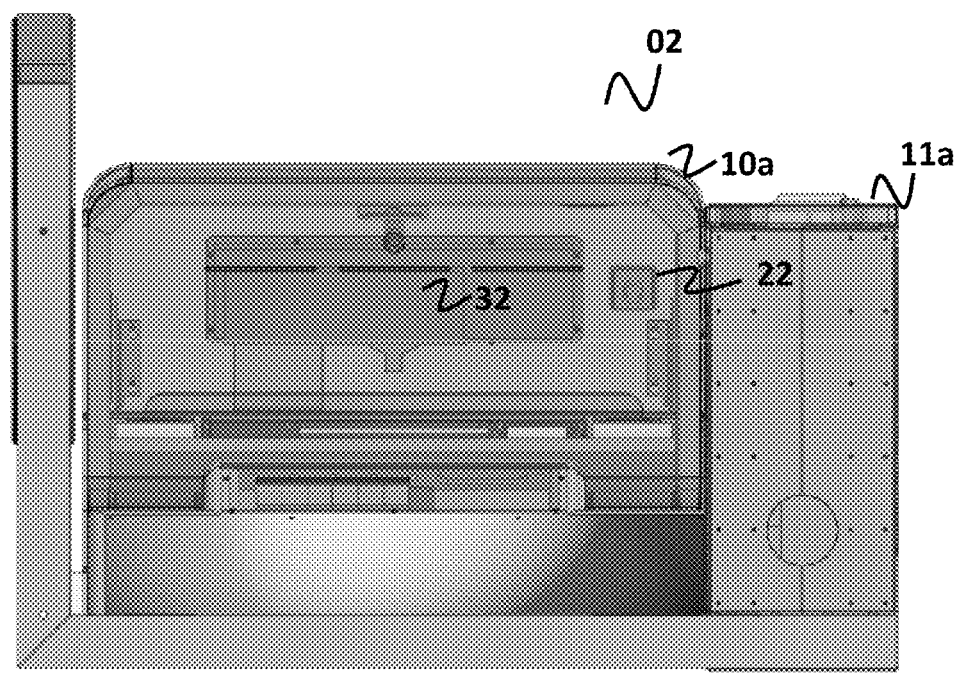
FIG. 4 is a bottom perspective view of the exemplary cabinet assembly utilized in the present hybrid gaming platform.
Figure 5:
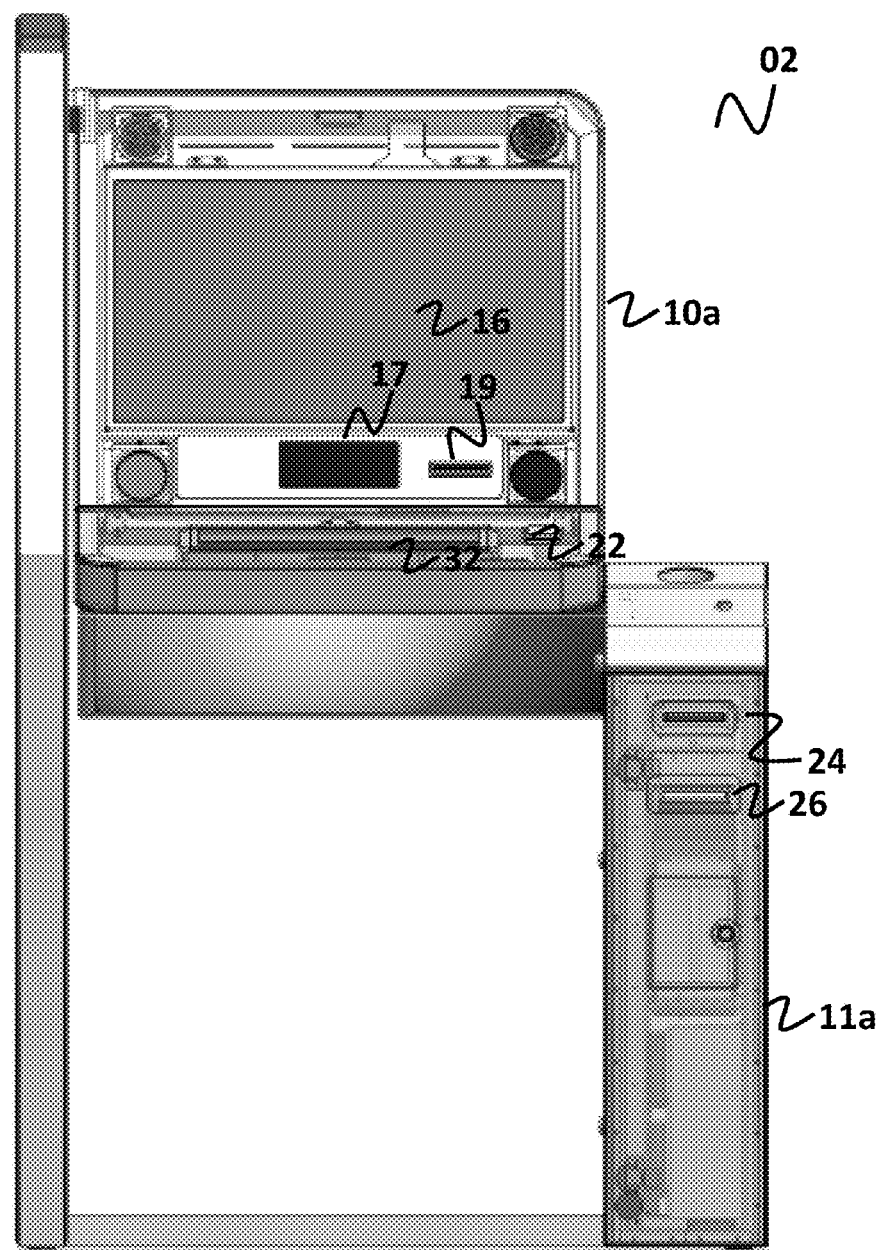
FIG. 5 is a front perspective view of the exemplary cabinet assembly utilized in the present hybrid gaming platform.
Figure 6:
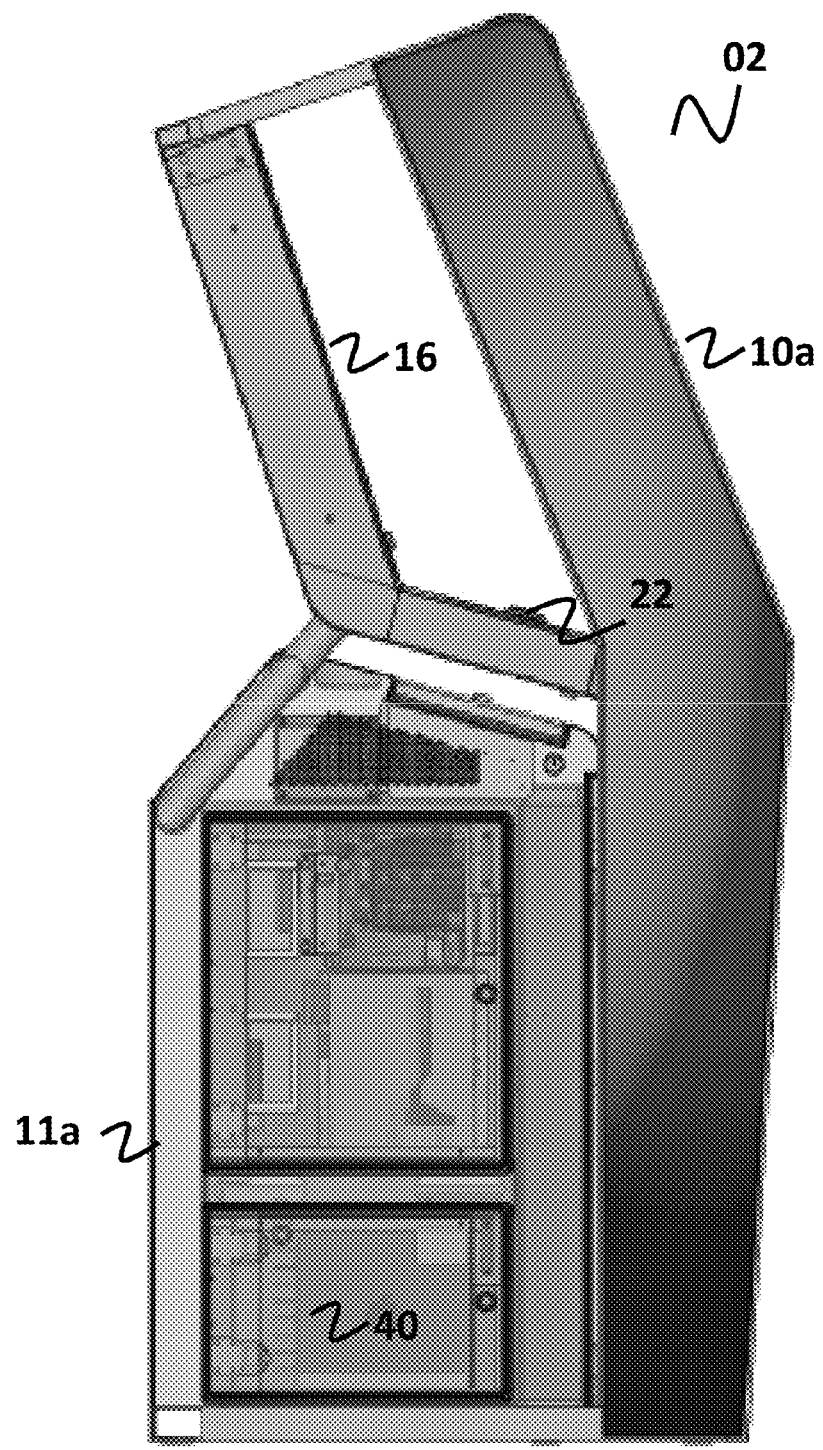
FIG. 6 is a left-side perspective view of the exemplary cabinet assembly utilized in the present hybrid gaming platform.
Figure 7:
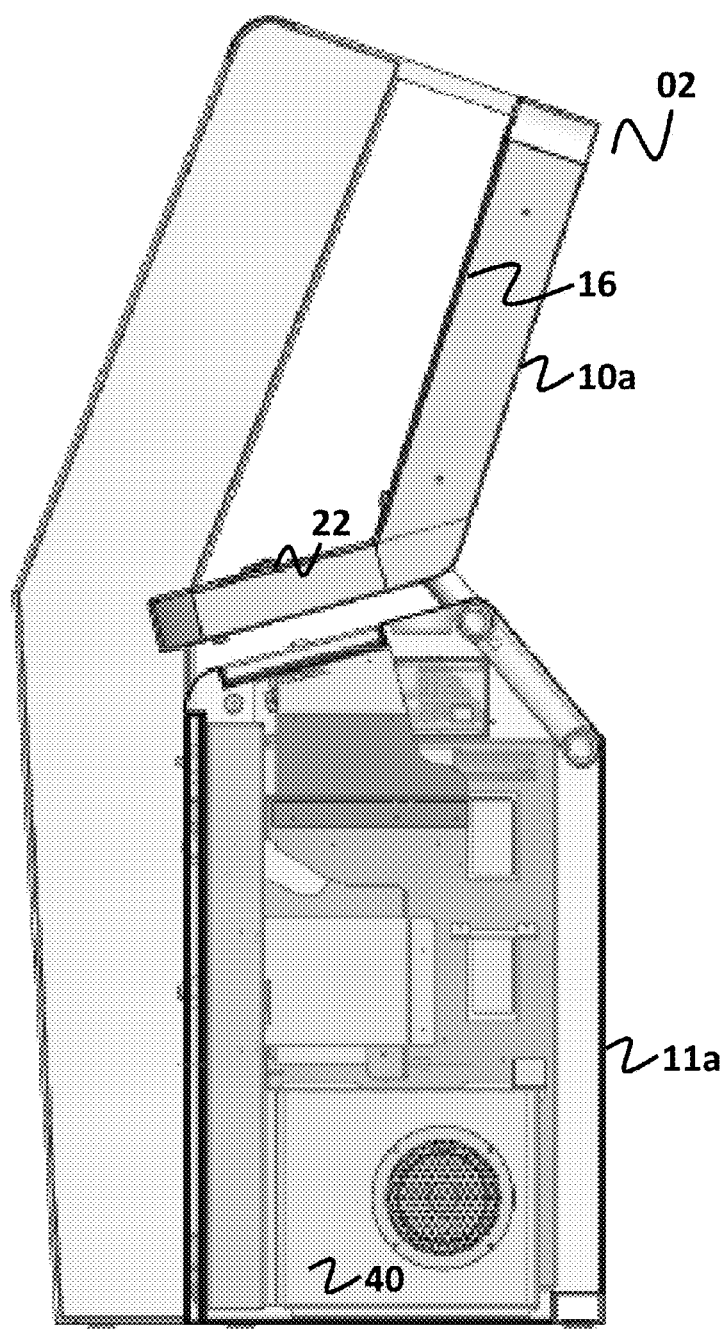
FIG. 7 is a right-side perspective view of the exemplary cabinet assembly utilized in the present hybrid gaming platform.
Figure 8:
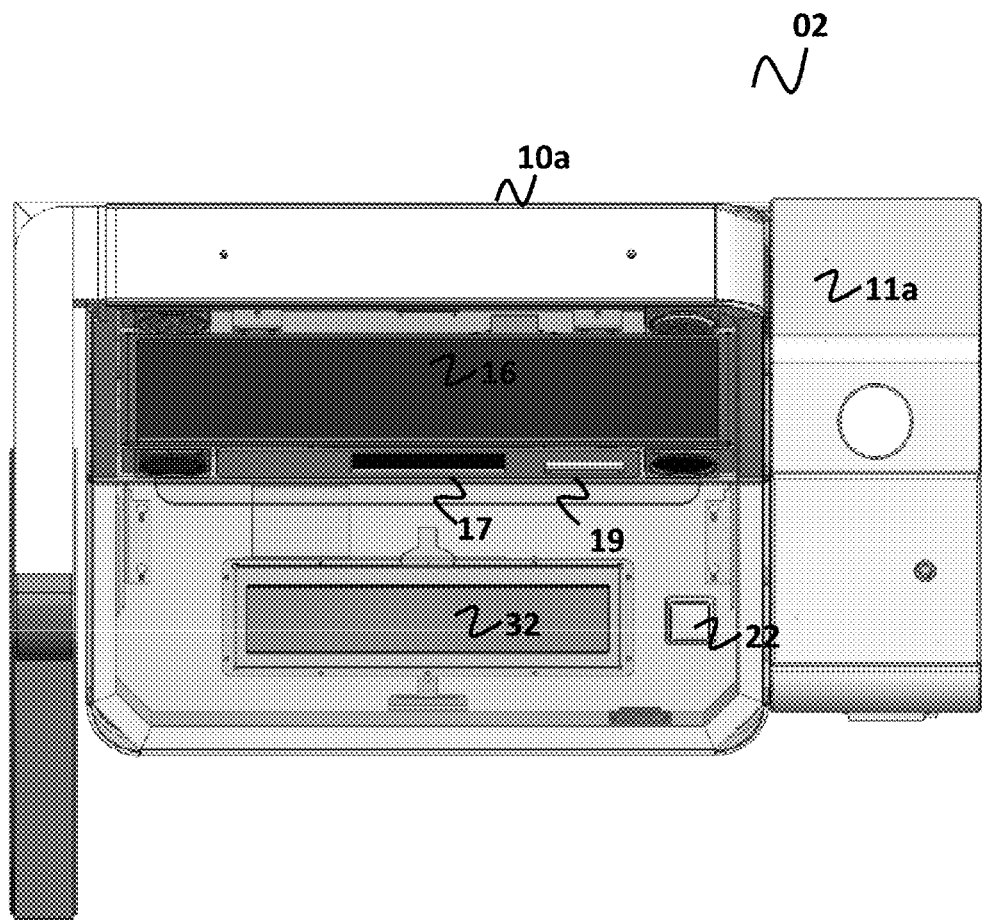
FIG. 8 is a top perspective view of the exemplary cabinet assembly utilized in the present system.
Figure 9:
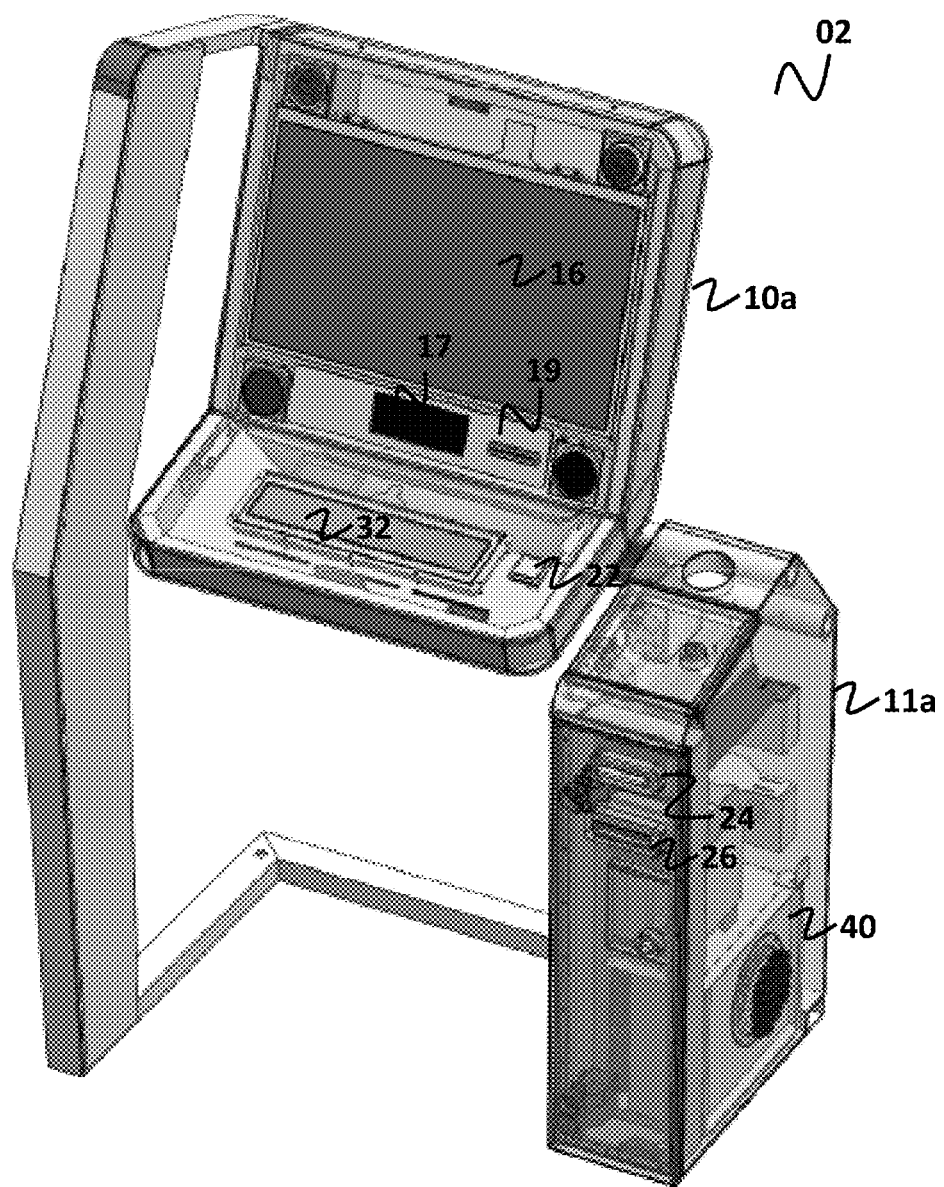
FIG. 9 is an angled perspective view of the exemplary cabinet assembly utilized in the present hybrid gaming platform.
Figure 10:
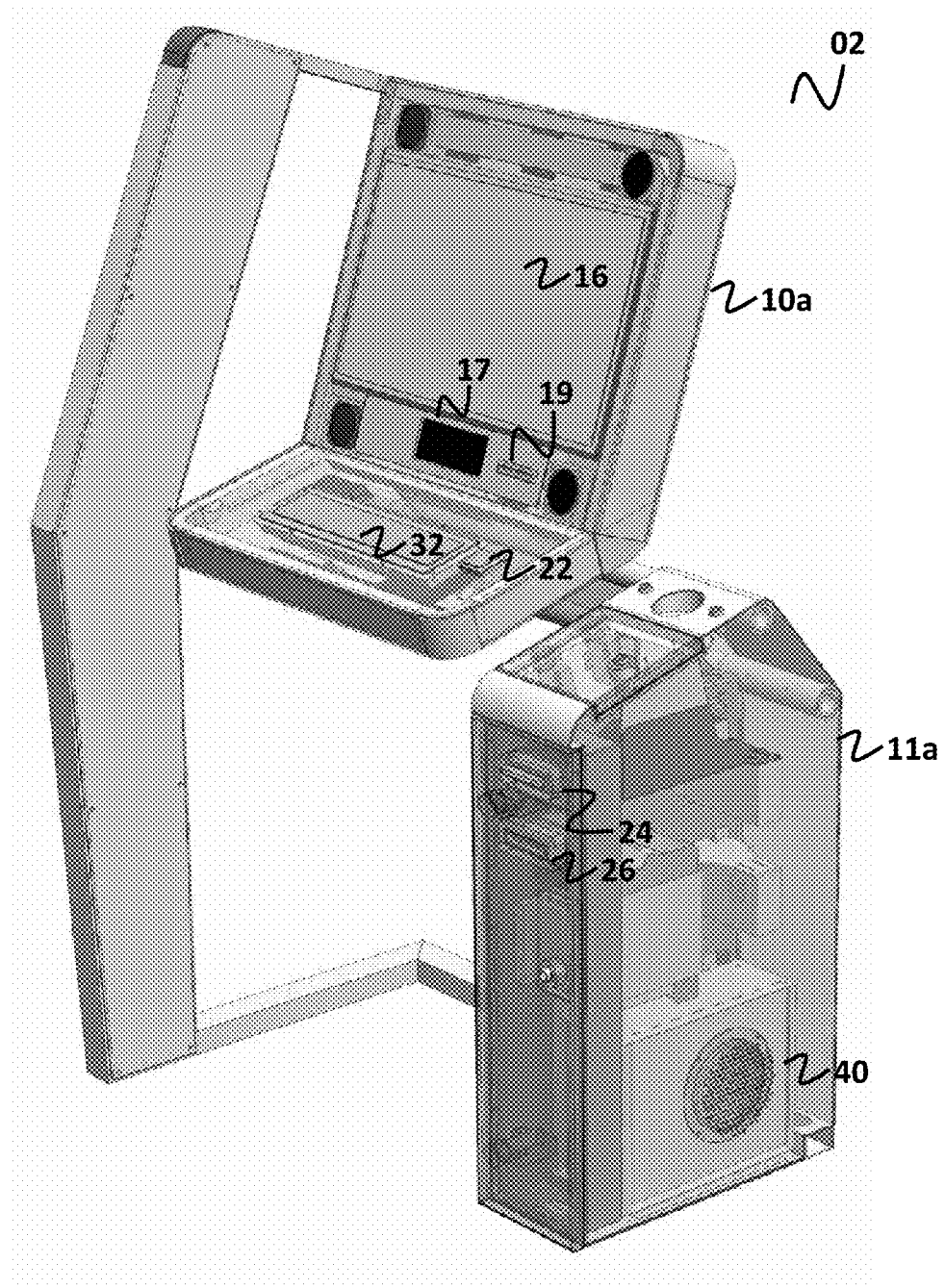
FIG. 10 is another angled perspective view of the exemplary cabinet assembly utilized in the present hybrid gaming platform.
Figure 11:
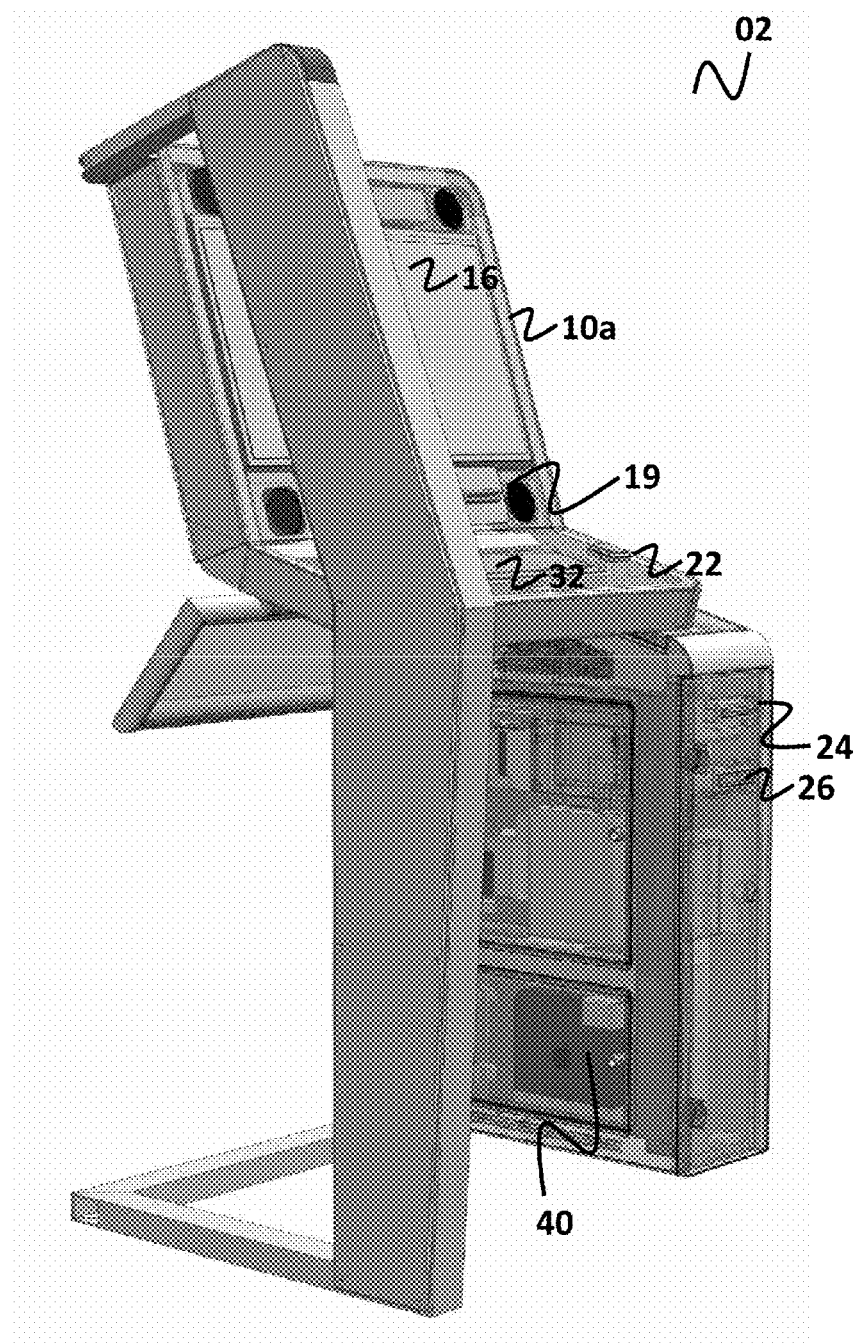
FIG. 11 is another angled perspective view of the exemplary cabinet assembly utilized in the present hybrid gaming platform.

FIG. 2 is a perspective view of another embodiment of a cabinet assembly 10 used within hybrid gaming platform 02. In this illustrated embodiment the cabinet assembly 10 includes a touch-based secondary display 32. The touch-based secondary display 32 may be used for player interaction with the hybrid gaming platform 02 during gameplay. This includes displaying game information as well as generation of necessary game controls for use by the player. The touch-based secondary display 32 may also be used for interaction by an operator of the hybrid gaming platform 02 during the verification and installation process of a game machine program.

Figure 12:
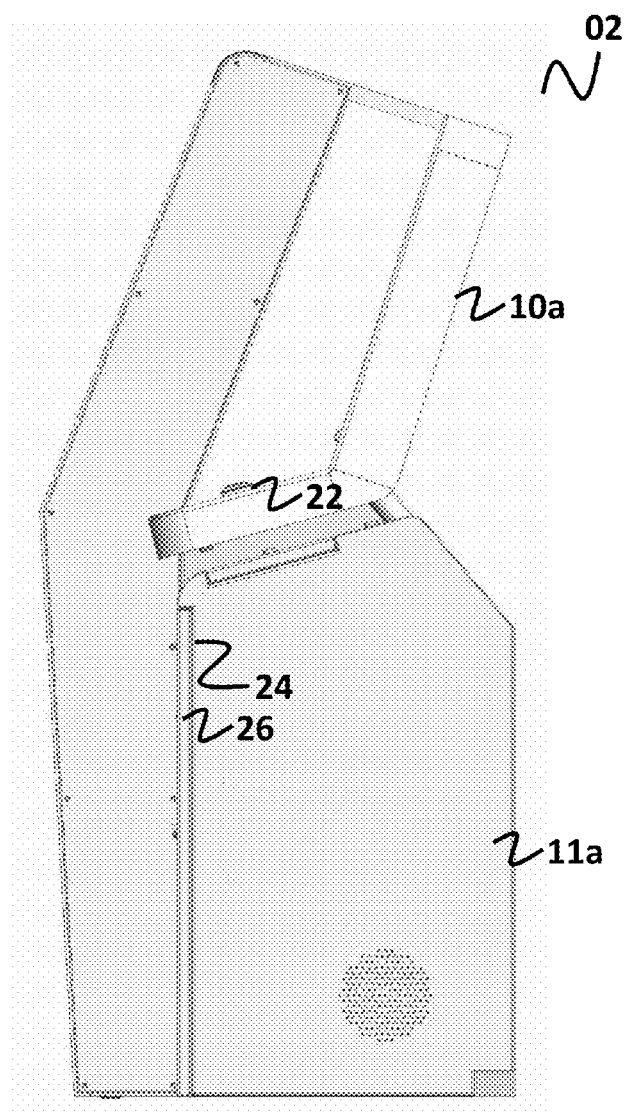
FIG. 12 is another right-side perspective view of the exemplary cabinet assembly utilized in the present hybrid gaming platform.
Figure 13:
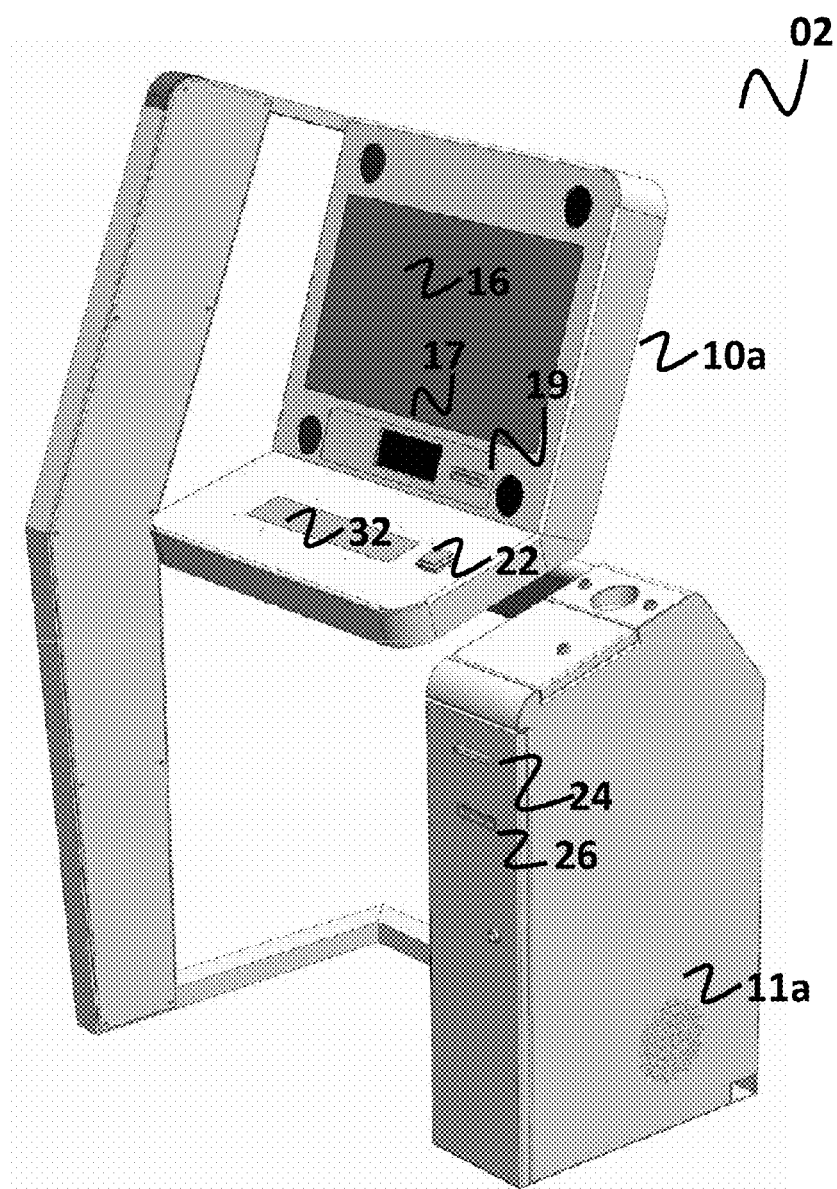
FIG. 13 is another angled perspective view of the exemplary cabinet assembly utilized in the present hybrid gaming platform.
Figure 14:
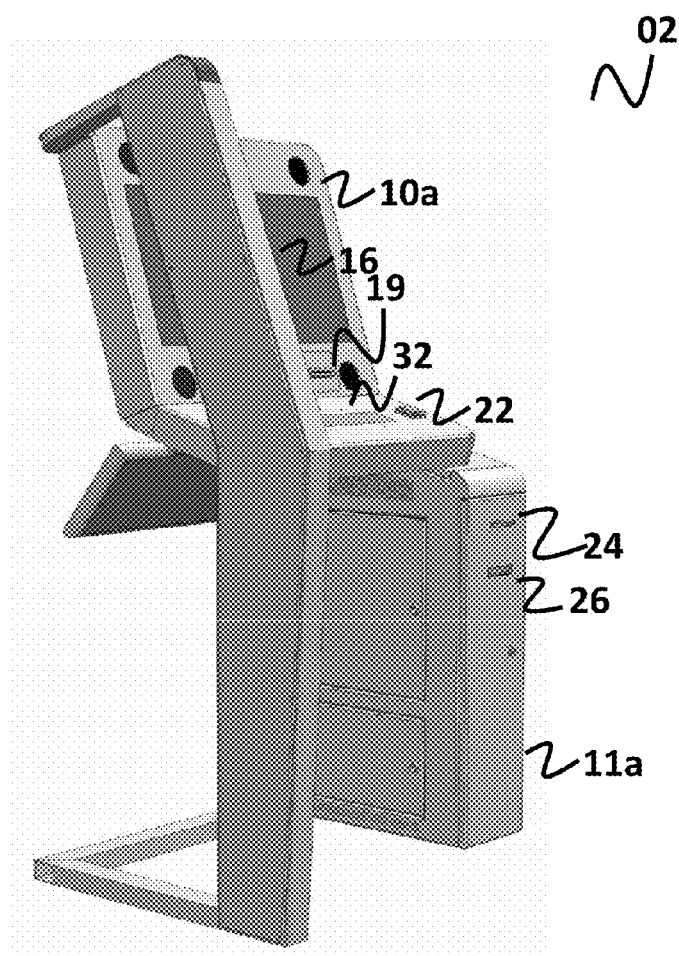
FIG. 14 is another angled perspective view of the exemplary cabinet assembly utilized in the present hybrid gaming platform.
Figure 15:
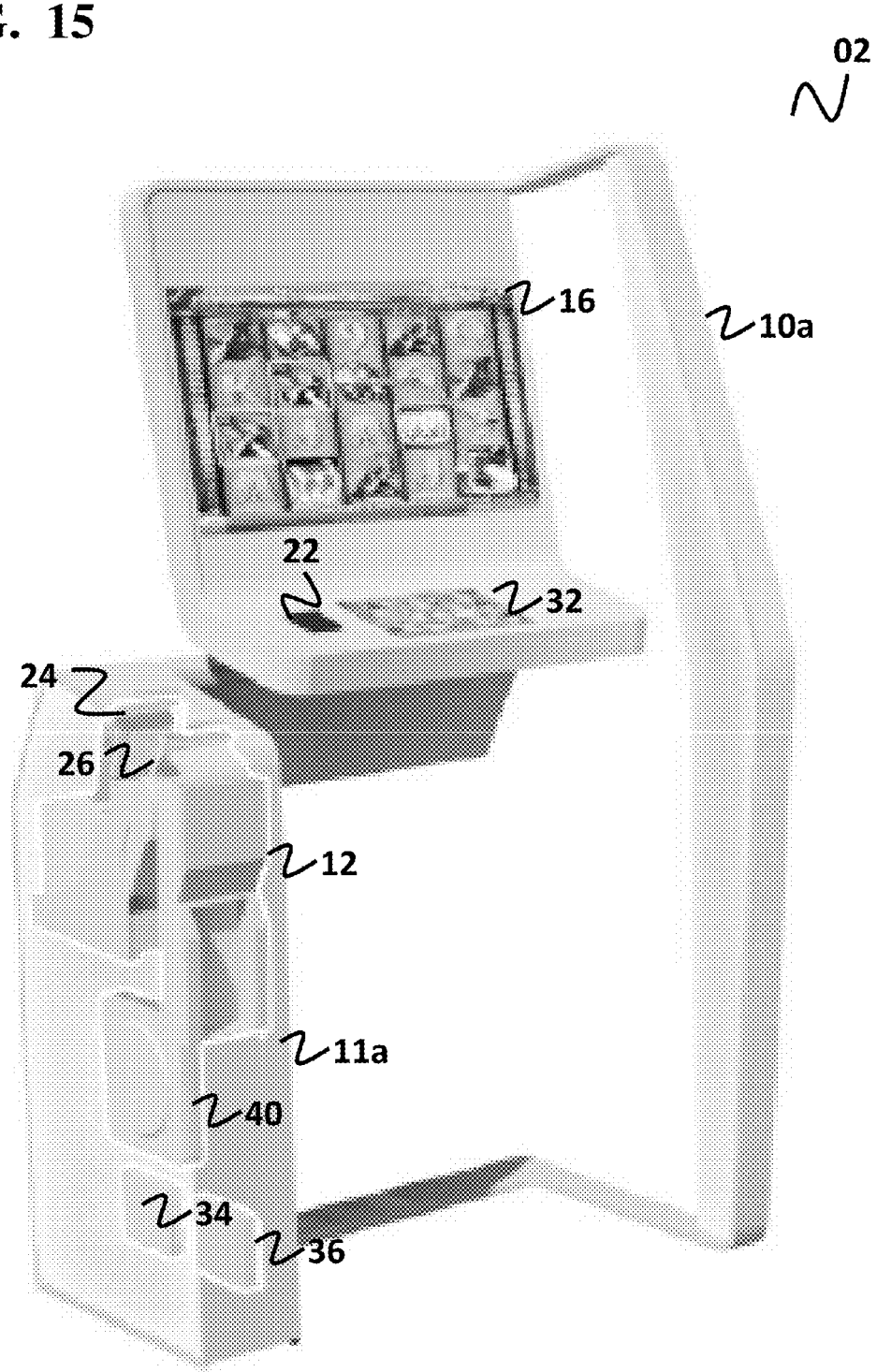
FIG. 15 is a front side perspective of an alternate embodiment of the exemplary cabinet assembly utilized in the present hybrid gaming platform.
Figure 16:
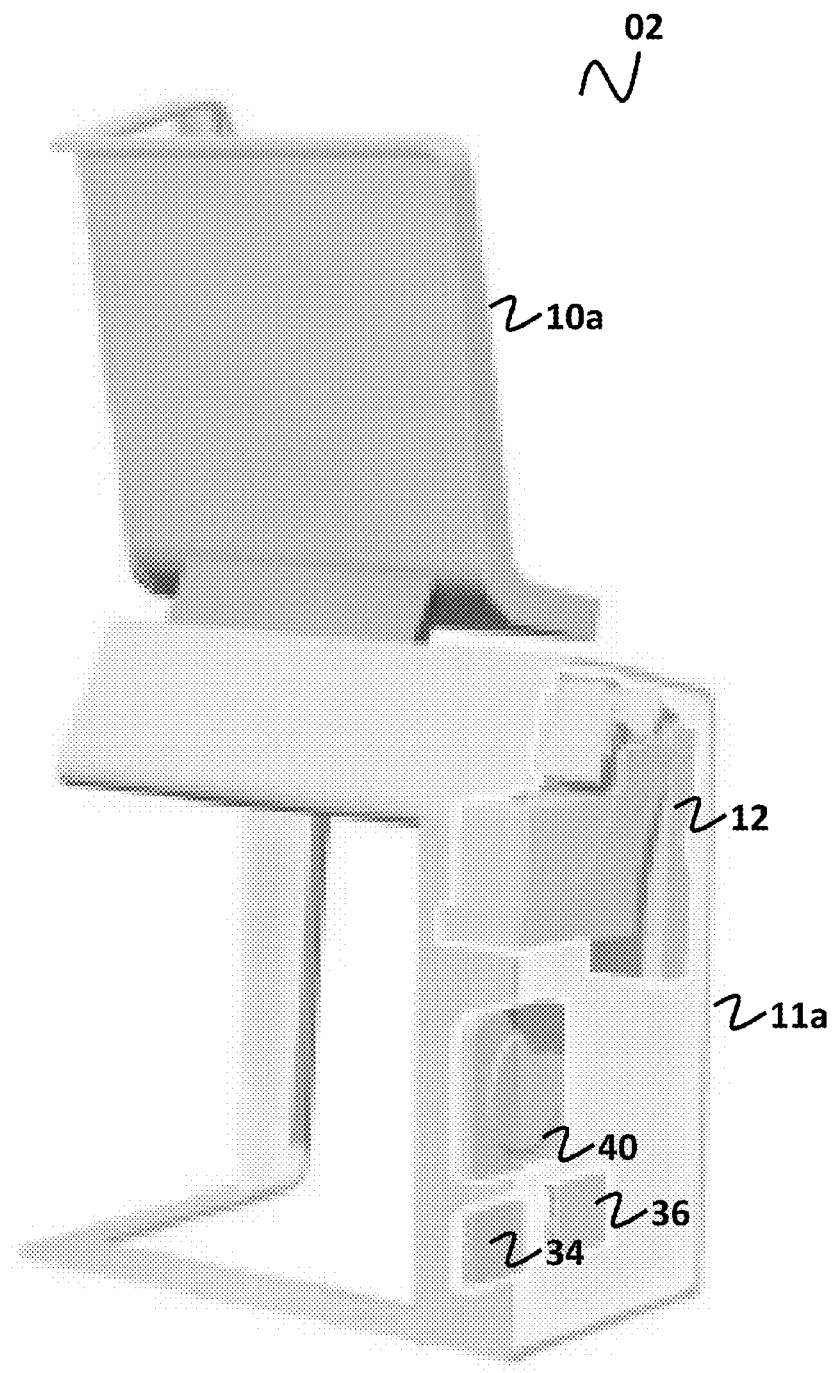
FIG. 16 is a rear side perspective of an alternate embodiment of the exemplary cabinet assembly utilized in the present hybrid gaming platform.
Figure 17:
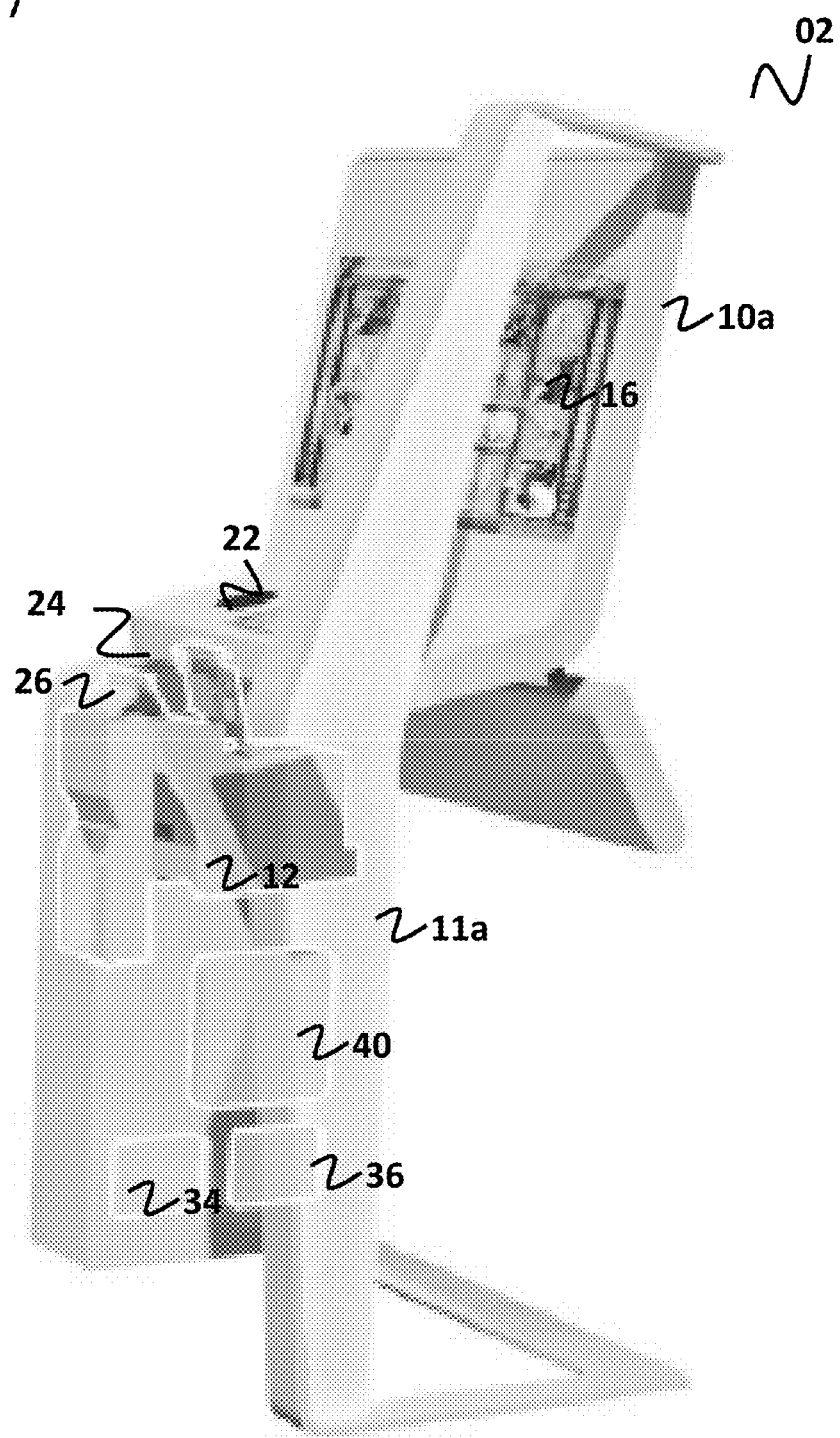
FIG. 17 is a right angled perspective of an alternate embodiment of the exemplary cabinet assembly utilized in the present hybrid gaming platform.
Figure 18:
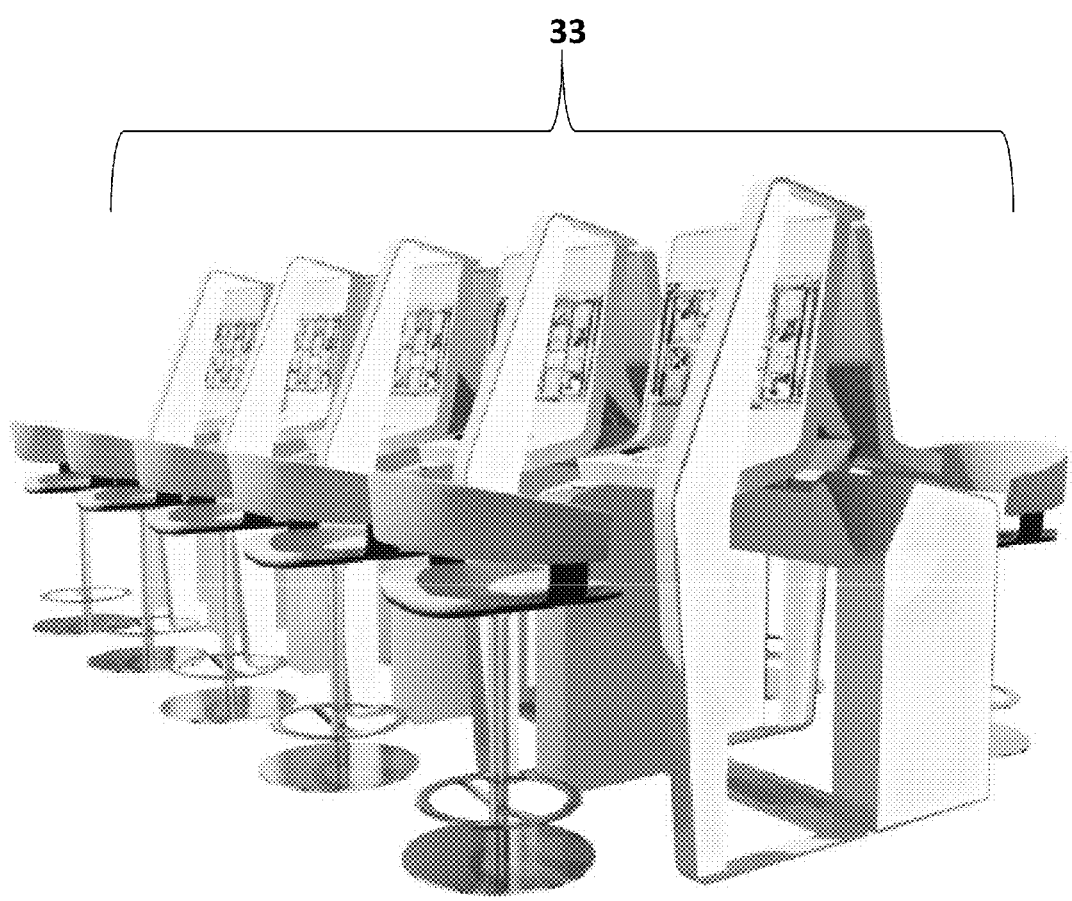
FIG. 18 is an angled perspective of a bank of exemplary cabinet assemblies utilized in the present hybrid gaming platform.
Figure 19:
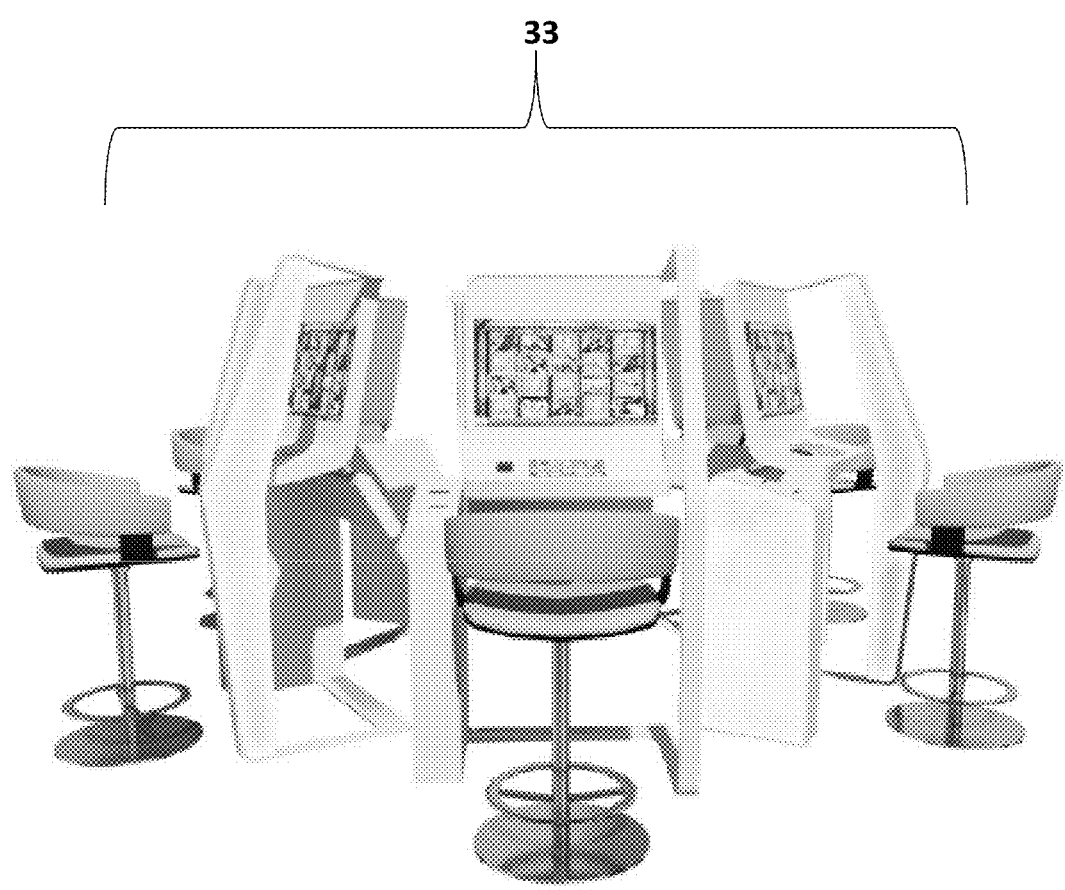
FIG. 19 is a circular bank of exemplary cabinet assemblies utilized in the present hybrid gaming platform.
Figure 20:
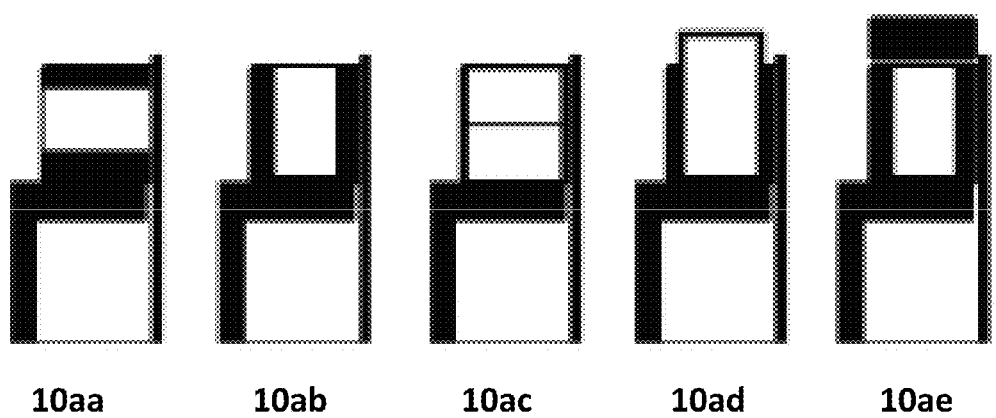
FIG. 20 shows a plurality of alternate display layouts of an embodiment of a cabinet assembly utilized in the present hybrid gaming platform.

FIGS. 3-11 and 15-17 are transparent perspectives of an embodiment of the cabinet assembly 10 (the embodiment labeled 10*a*) utilized by the hybrid gaming platform 02. This embodiment further includes a small secondary display 17 and a card reader 19 below the display 16. The secondary display 17 may be used in order to interact with the card reader 19 during gameplay by a player. Additional gaming and usage information to the player may be related through the small secondary display 17. The card reader 19 may be utilized to reader any type of magnetic strip type card in order to verify the identity of the player or access particular features within the hybrid gaming platform 02. Such features may include loyalty programs, verification information, payments options, or any additional features that require a magnetic strip identification card. Each figure shows the various game components 14/20 as they reside within the cabinet assembly 10*a*. The design of the cabinet assembly 10*a* within the embodiment shown in FIGS. 1-20 houses the plurality of gaming components 14/20 within a compartment 11*a* that is along the side of the cabinet assembly 10*a*. The compartment 11*a* can be on either the left or right hand side of the cabinet assembly 10*a*. Furthermore, the compartment 11*a* may also include a harness 12 in order to hold all of the gaming components 14/20 within the compartment 11*a*. The harness 12 is an internal structure that supports all the gaming components 14/20 within the compartment 11 in order to provide access and security. In this case the compartment 11*a* acts as a support for the rest of the cabinet assembly 10*a* structure. FIGS. 12-14 show non-transparent perspectives of the cabinet assembly 10*a* and demonstrate the various access panels into the compartment 11*a* of the cabinet assembly 10*a*. Access panels along the side of the compartment 11*a* provide access to the plurality of gaming components 14/20 found within the hybrid gaming platform 02.

Figure 21:
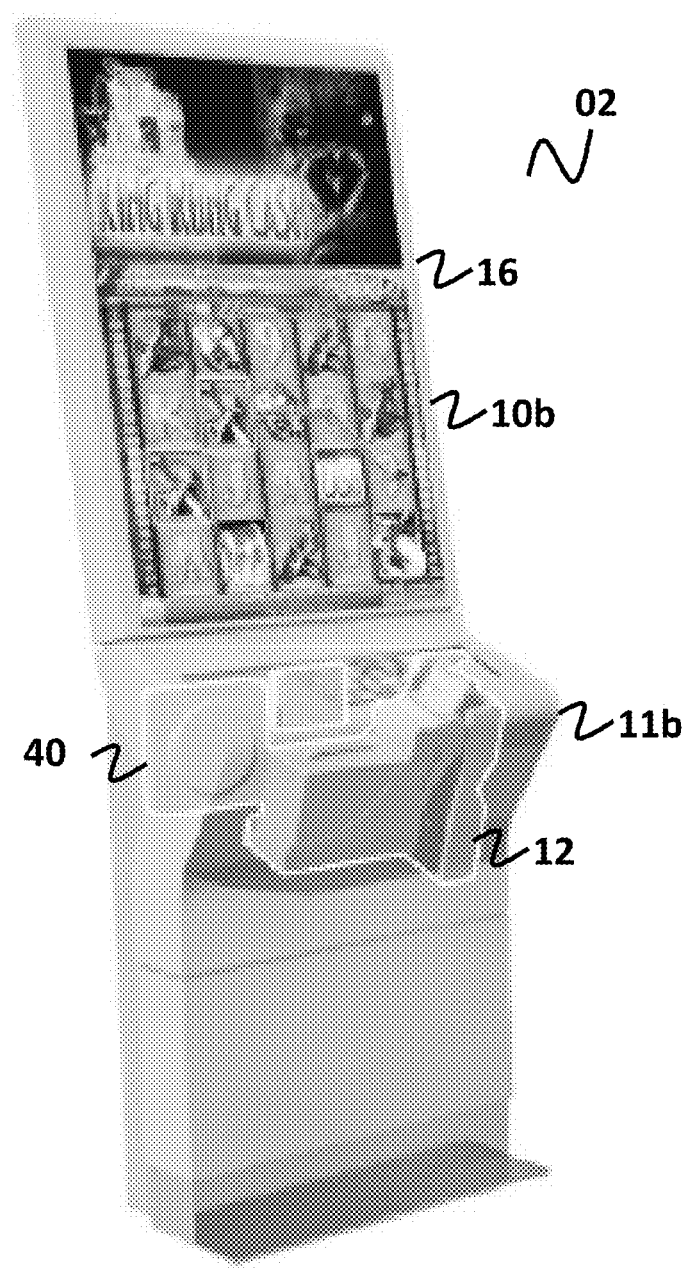
FIG. 21 is a front side perspective of an alternate embodiment of the exemplary cabinet assembly utilized in the present hybrid gaming platform.
Figure 22:
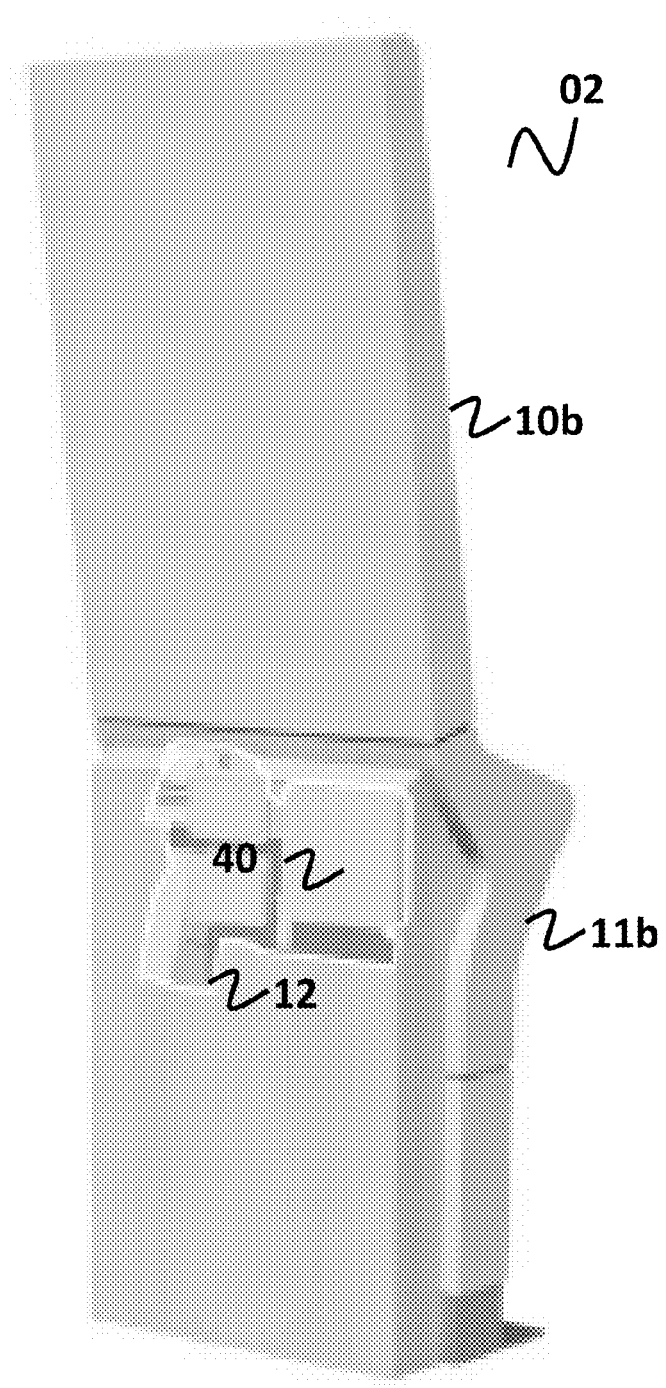
FIG. 22 is a rear side perspective of an alternate embodiment of the exemplary cabinet assembly utilized in the present hybrid gaming platform.
Figure 23:
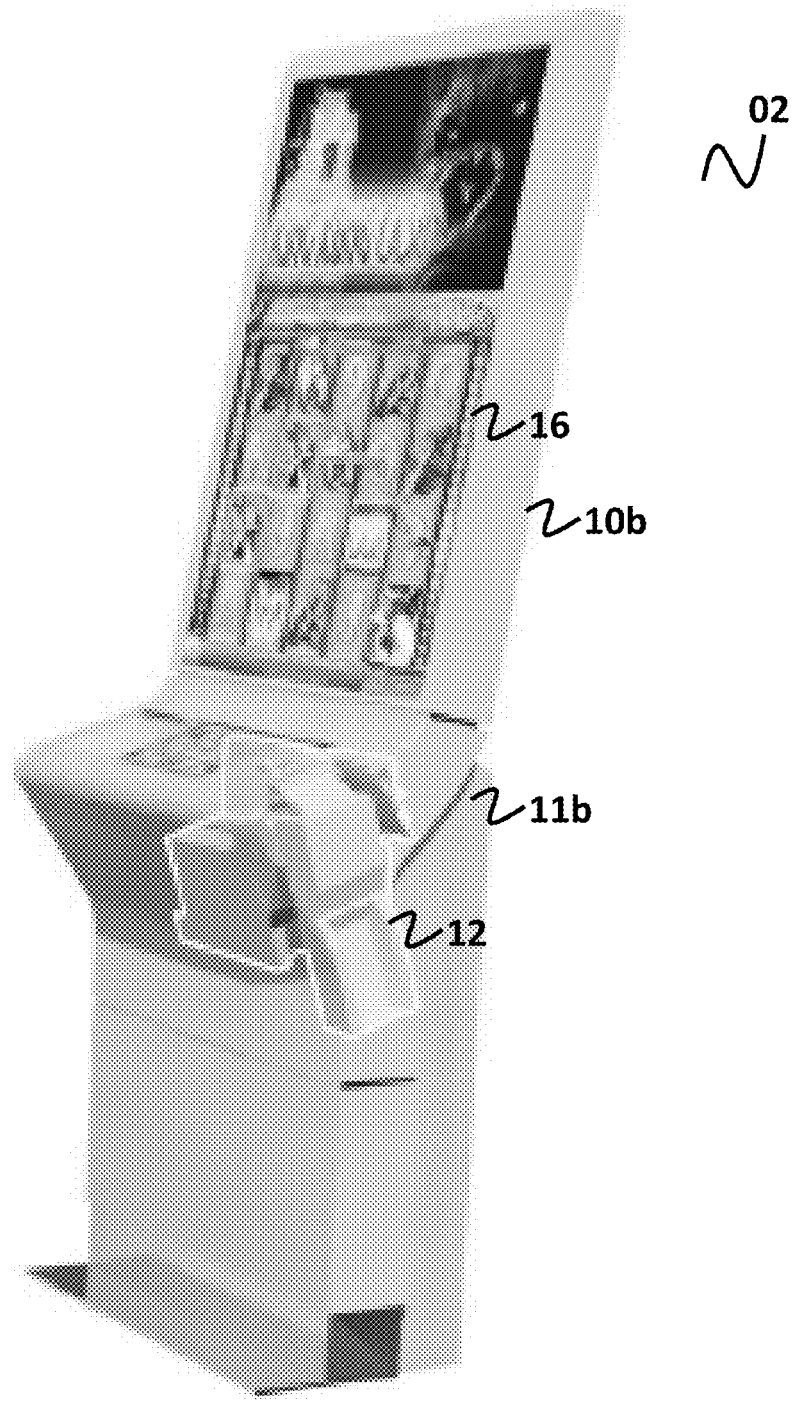
FIG. 23 is a right angled perspective of an alternate embodiment of the exemplary cabinet assembly utilized in the present hybrid gaming platform.
Figure 24:
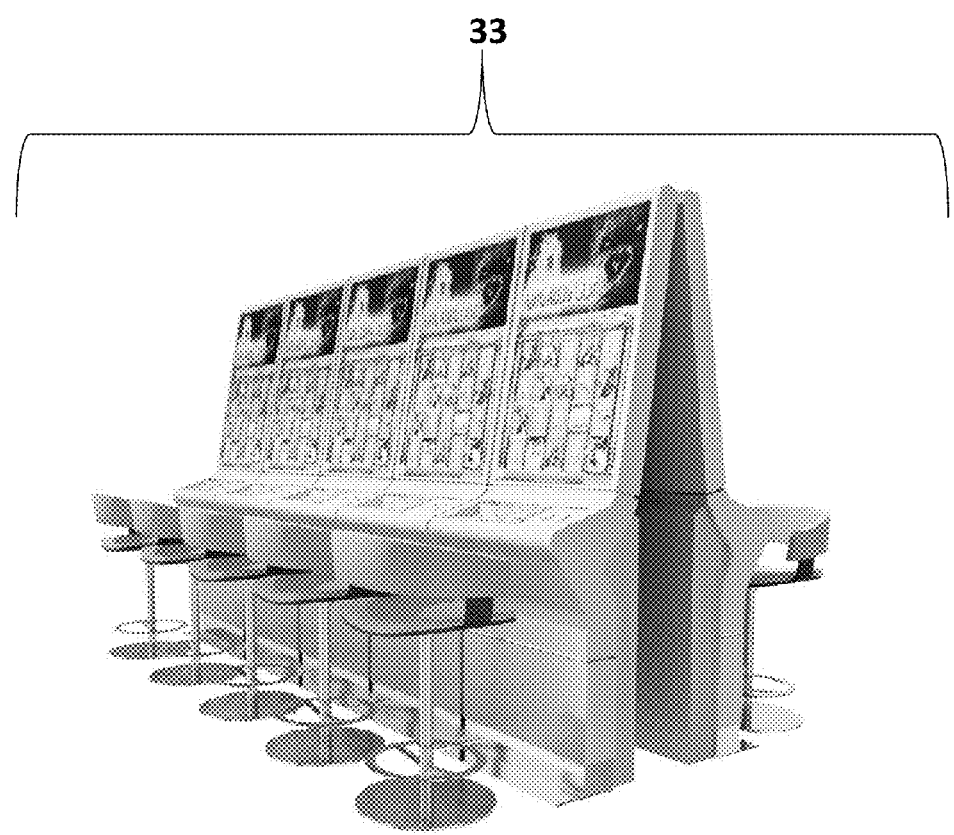
FIG. 24 is an angled perspective of a bank of exemplary cabinet assemblies utilized in the present hybrid gaming platform.
Figure 25:
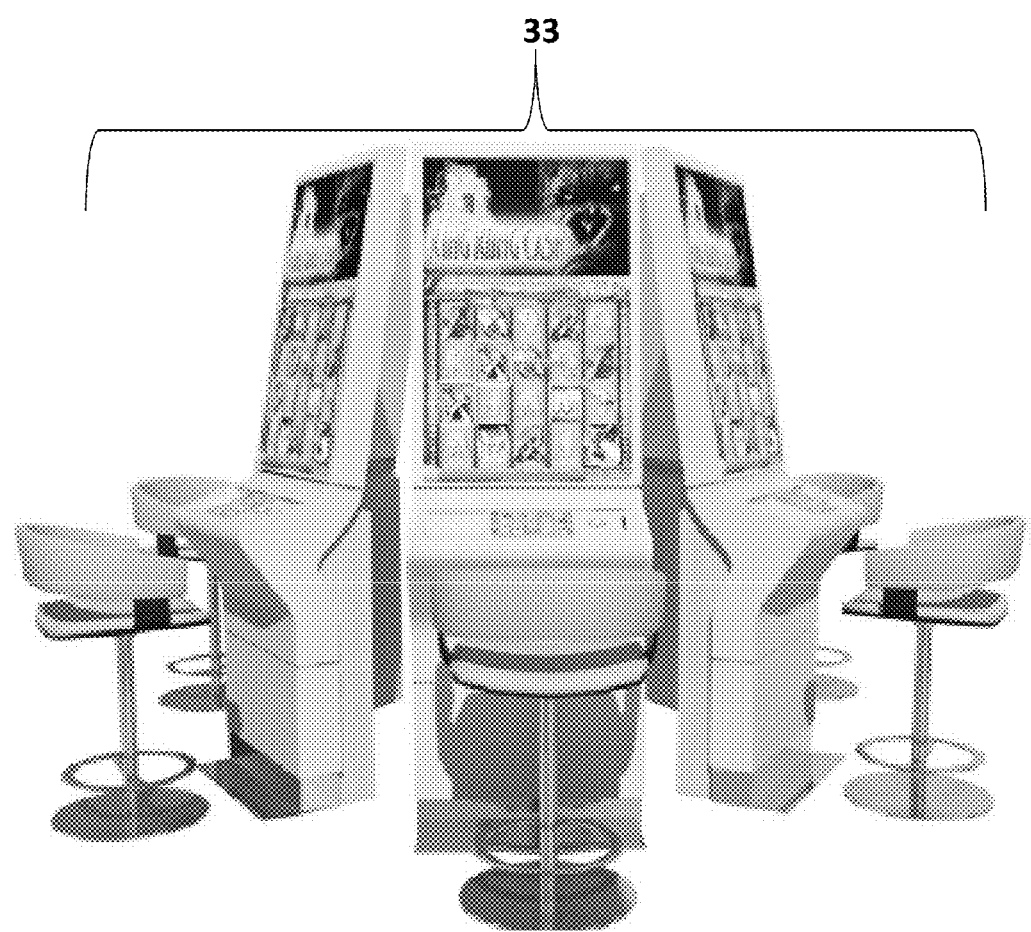
FIG. 25 is a circular bank of exemplary cabinet assemblies utilized in the present hybrid gaming platform.
Figure 26:
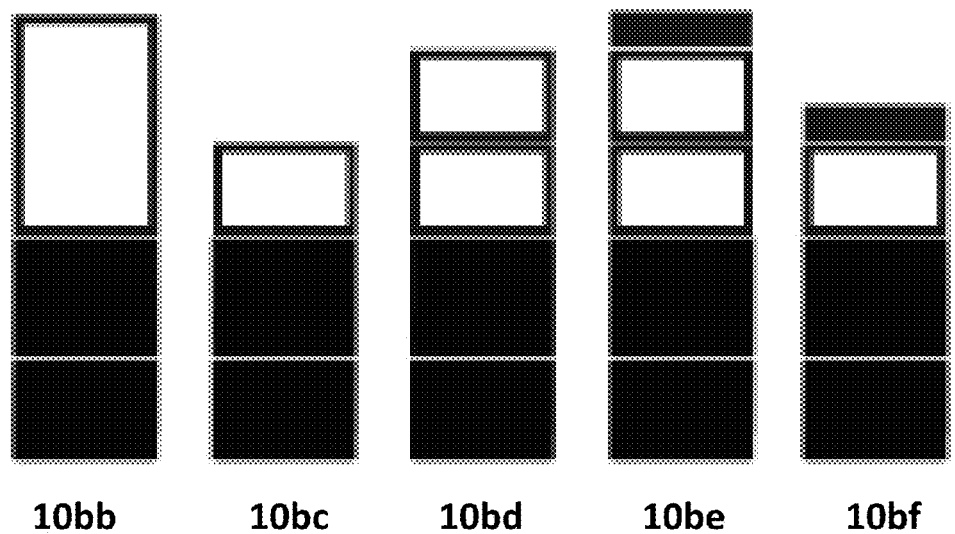
FIG. 26 shows a plurality of alternate display layouts of an embodiment of a cabinet assembly utilized in the present hybrid gaming platform.

FIGS. 21-23 show an alternate embodiment 10*b* of the cabinet assembly 10 utilized within the hybrid gaming platform 02. Within the present embodiment 10*b* the compartment 11*b* serves as the entire support for the cabinet assembly 10, with the plurality of gaming components 14/20 housed within the compartment 11. A harness 12 may also be incorporated into the compartment 11*b* in order to house all of the gaming components 14/20. Based on the configuration of the harness 12 within the compartment 11*b*, the plurality of gaming components 14/20 may be aligned horizontally along the width of the cabinet assembly 10*b*.

Figure 27:
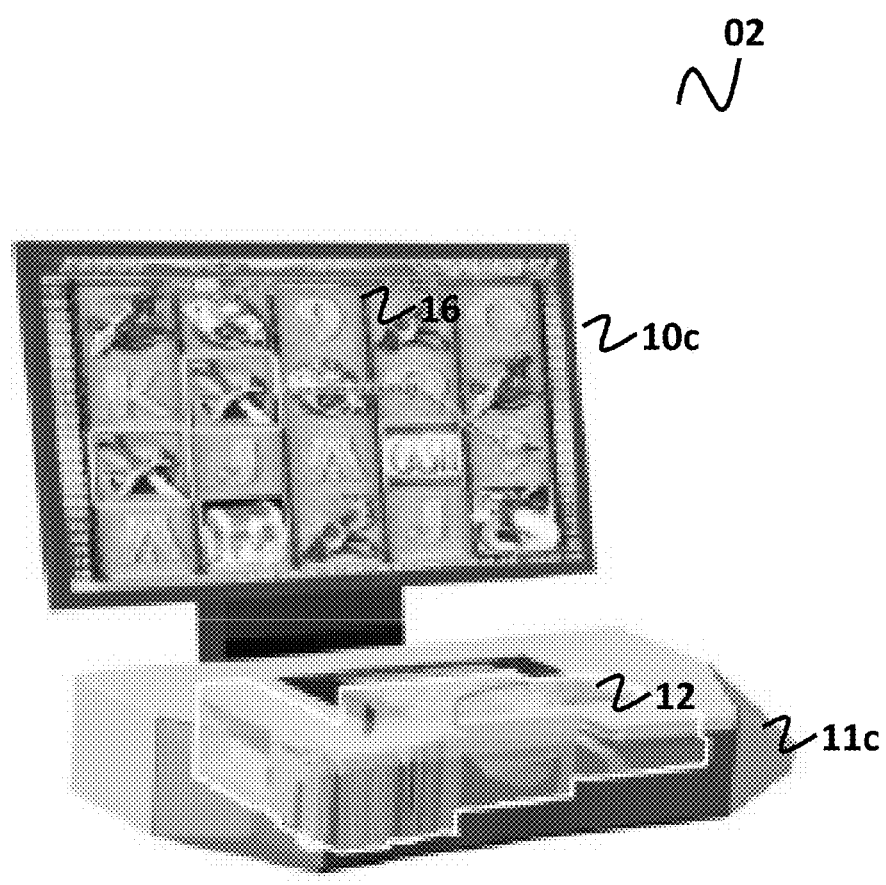
FIG. 27 is a front side perspective of an alternate embodiment of the exemplary cabinet assembly utilized in the present hybrid gaming platform.
Figure 28:
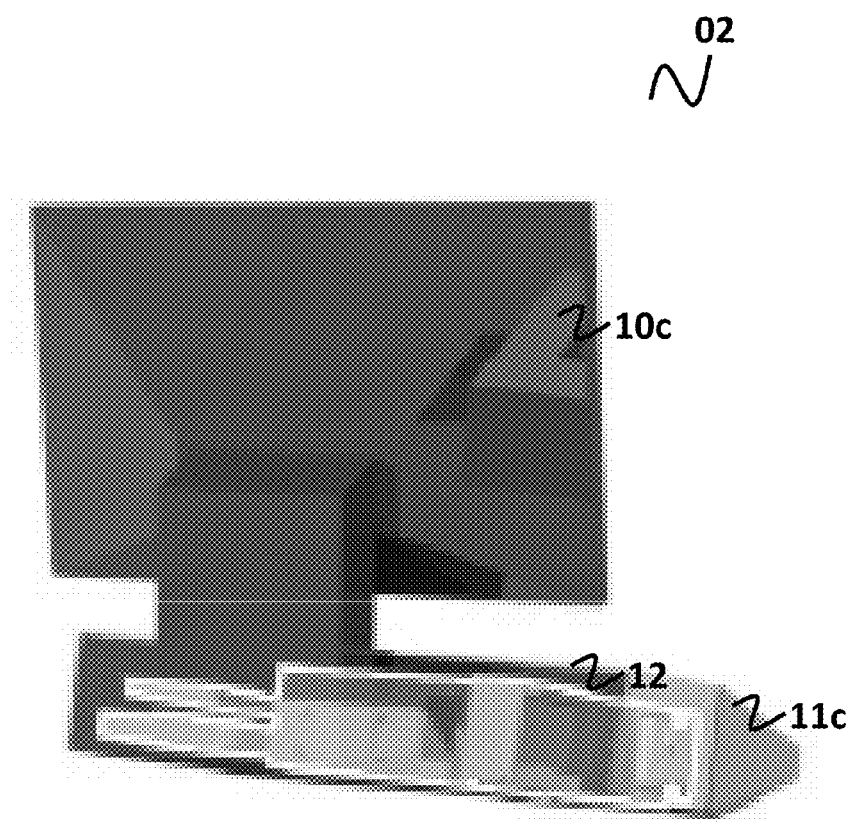
FIG. 28 is a rear side perspective of an alternate embodiment of the exemplary cabinet assembly utilized in the present hybrid gaming platform.
Figure 29:
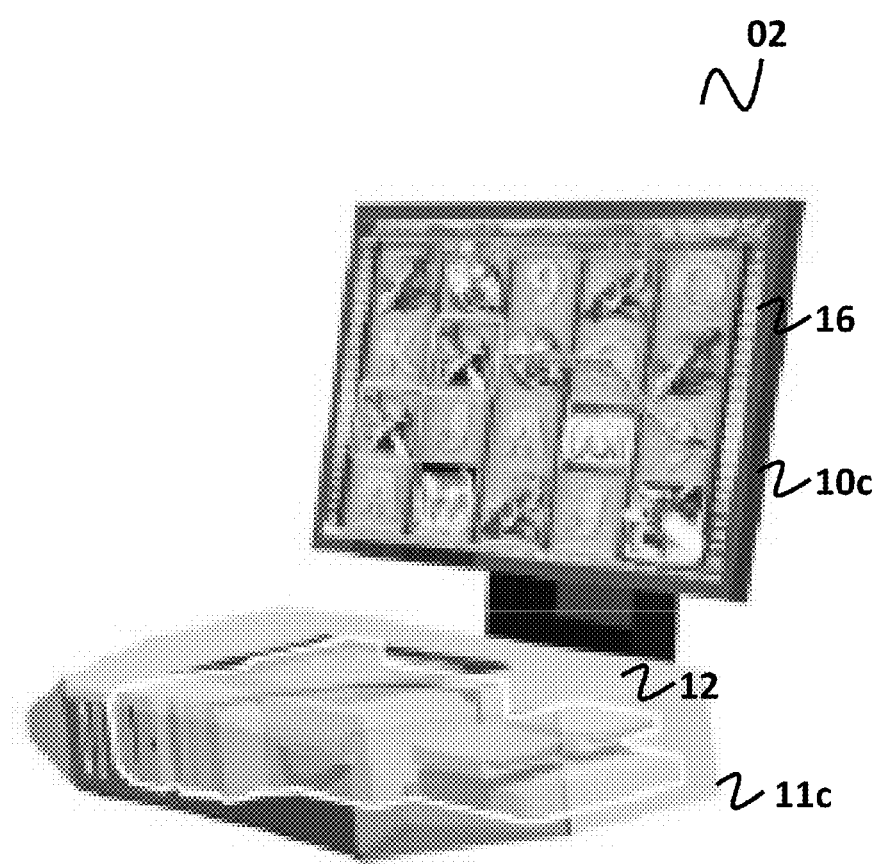
FIG. 29 is a right angled perspective of an alternate embodiment of the exemplary cabinet assembly utilized in the present hybrid gaming platform.
Figure 30:
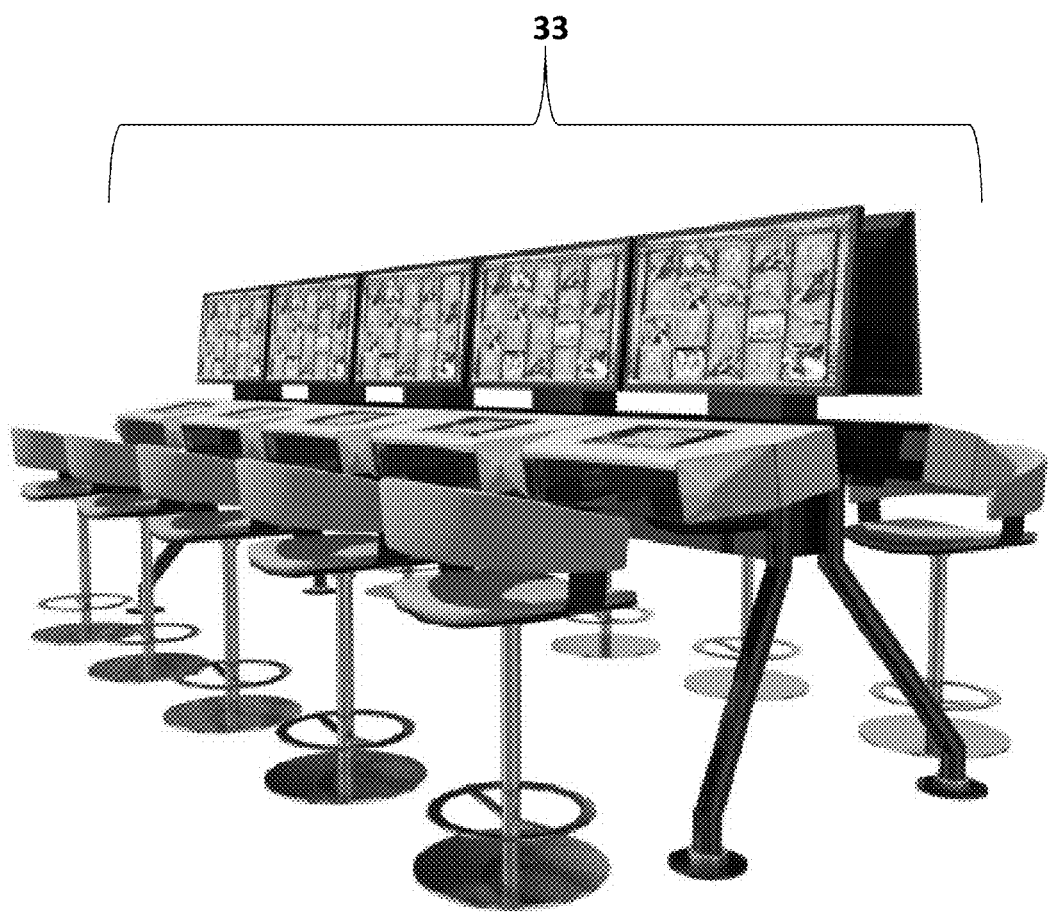
FIG. 30 is an angled perspective of a bank of exemplary cabinet assemblies utilized in the present hybrid gaming platform.
Figure 31:
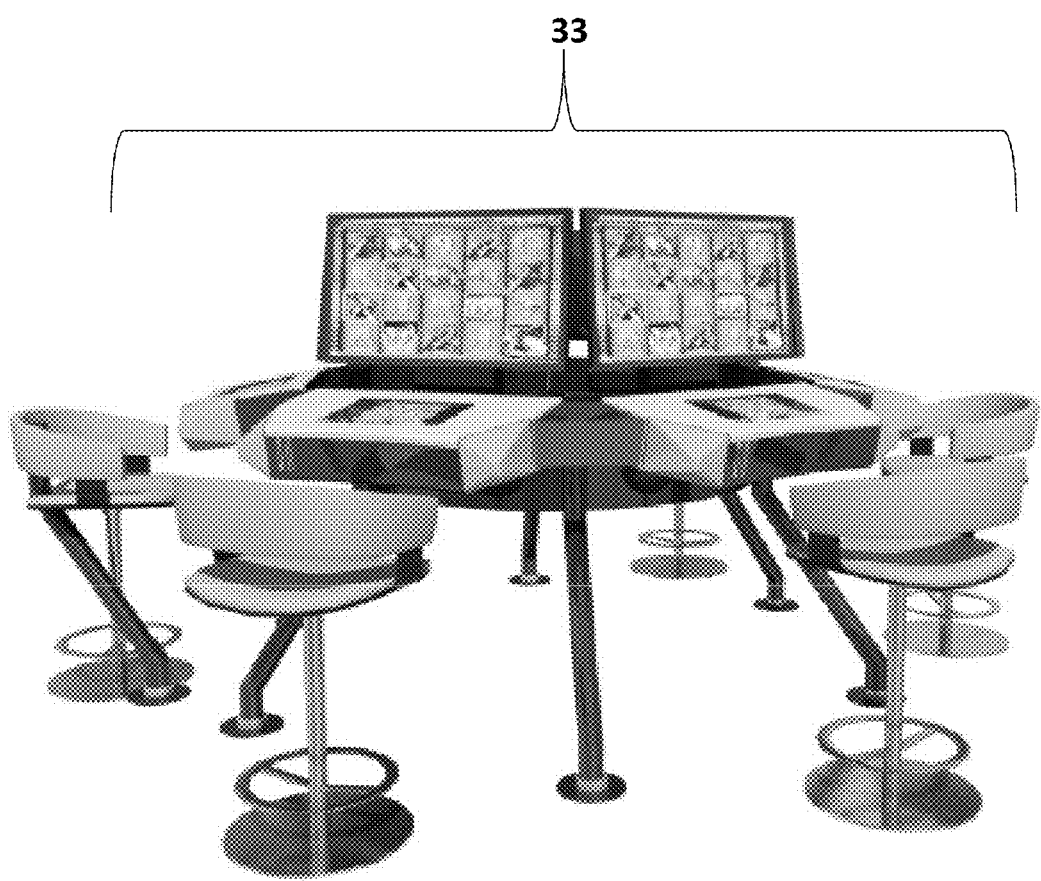
FIG. 31 is a circular bank of exemplary cabinet assemblies utilized in the present hybrid gaming platform.
Figure 32:
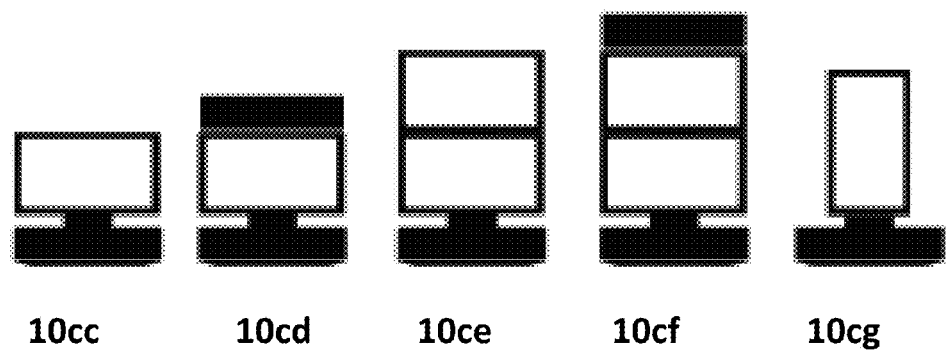
FIG. 32 shows a plurality of alternate display layouts of an embodiment of a cabinet assembly utilized in the present hybrid gaming platform.

FIGS. 27-29 show another alternate embodiment 10*c* of the cabinet assembly 10 utilized within the hybrid gaming platform 02. Within this embodiment the compartment 11*c* is shown as compact unit with the plurality of gaming components 14/20 housed along the width of the compartment. The gaming components 14/20 may be arranged in order to minimize the size of the compartment 11*c*. The compartment 11*c* may be minimized in order to fit directly behind the display 16 or in an alternate location away from the display 16 and away from the view of the player.

Figure 33:
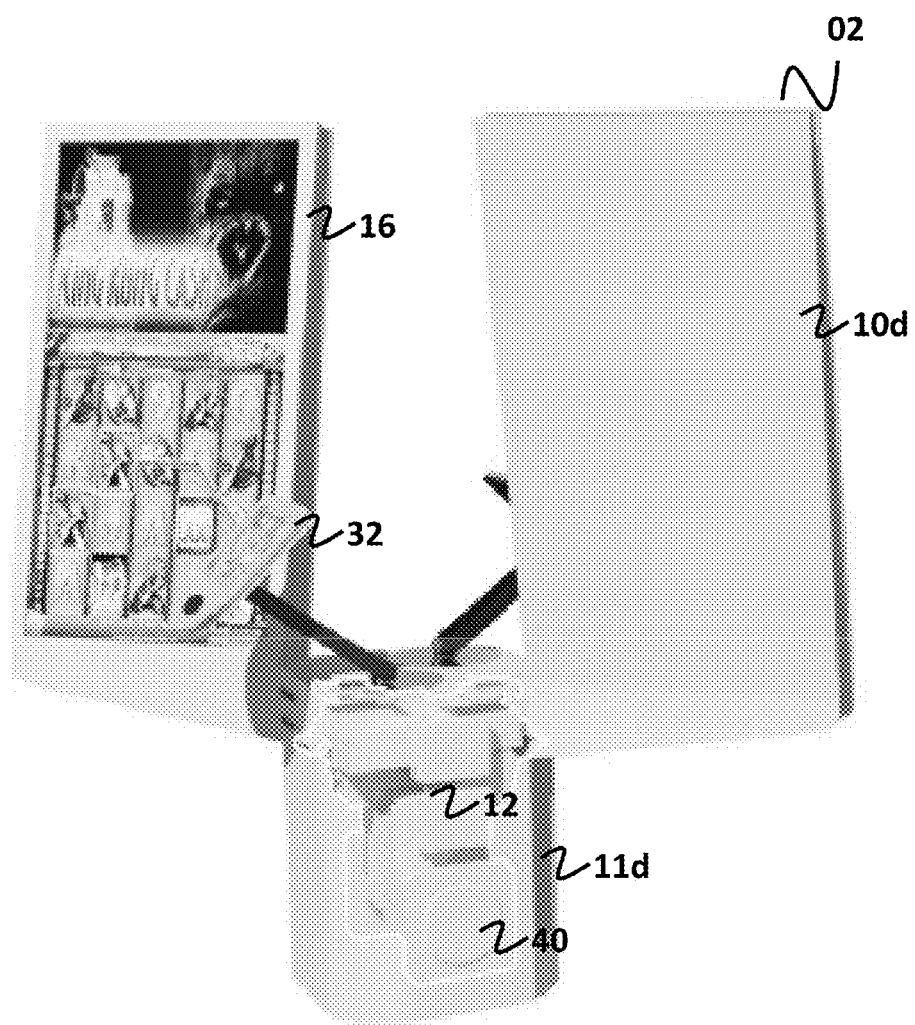
FIG. 33 is a left angled perspective of an alternate embodiment of the exemplary cabinet assembly utilized in the present hybrid gaming platform.
Figure 34:
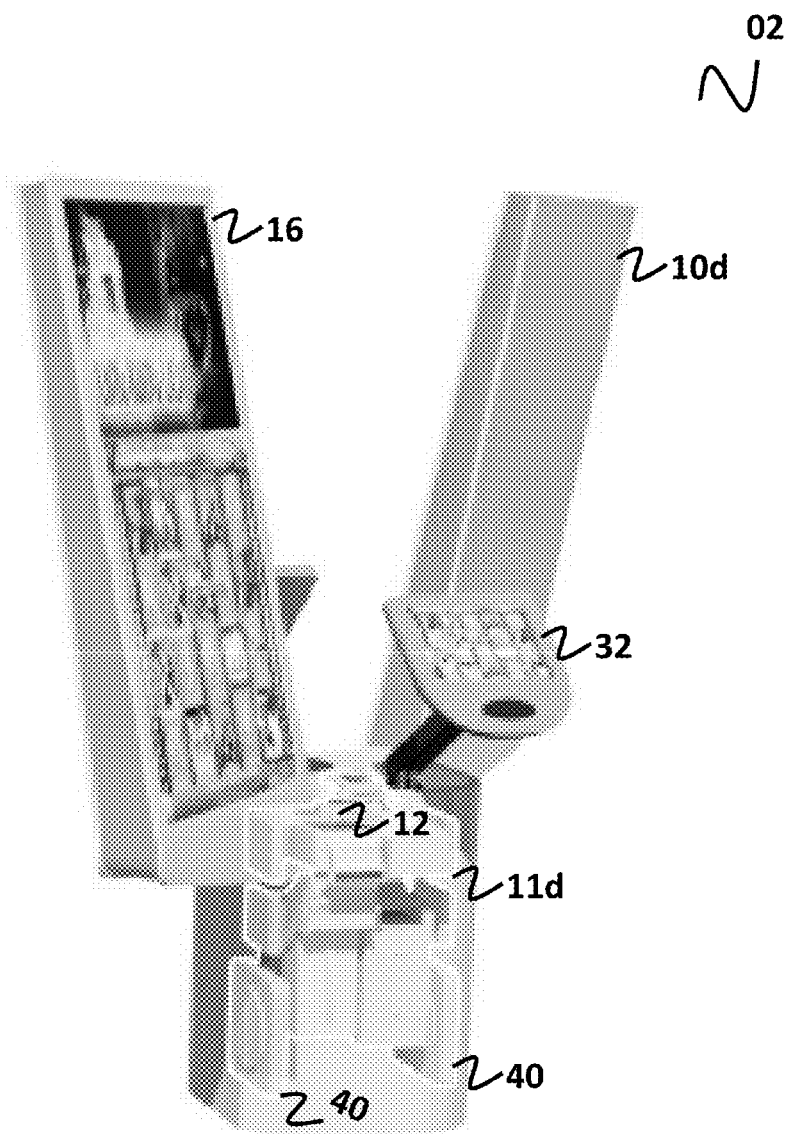
FIG. 34 is a right angled perspective of an alternate embodiment of the exemplary cabinet assembly utilized in the present hybrid gaming platform.
Figure 35:
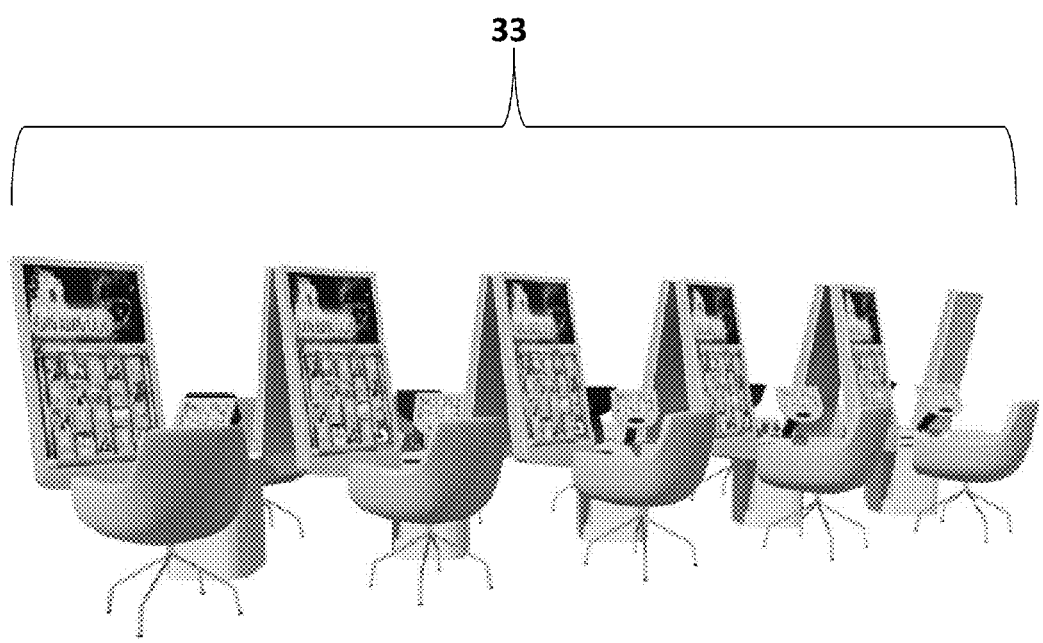
FIG. 35 is an angled perspective of a bank of exemplary cabinet assemblies utilized in the present hybrid gaming platform.
Figure 36:
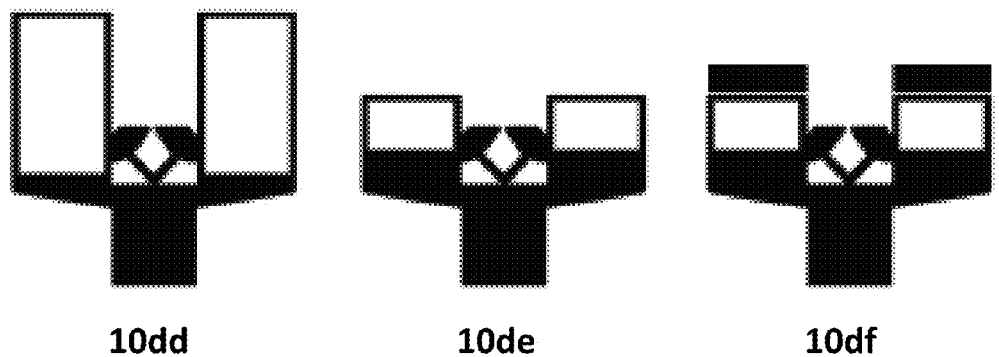
FIG. 36 shows a plurality of alternate display layouts of an embodiment of a cabinet assembly utilized in the present hybrid gaming platform.

FIGS. 33 and 34 show another alternate embodiment 10*d* of the cabinet assembly 10 utilized within the hybrid gaming platform 02. Within this embodiment the compartment 11*d* is fitted to hold gaming components 14/20 for two systems 02. Alternatively, the compartment 11 may be fitted to hold additional gaming components 14/20 for additional systems 02. In the present embodiment, the compartment 11*d* serves as a support for two displays 16 and two touch-based secondary displays 32. The compartment 11*d* may also be separated from the display 16 or the touch-based secondary display 32 completely and arranged to provide a different viewing or gaming experience for a player.

FIGS. 18, 19, 24, 25, 30, 31, and 35 show pluralities of cabinet assemblies 10 utilized within hybrid gaming platform 02 set up as a bank 33 of machines within a larger gaming space. Banks 33 of cabinet assemblies 10 can be set up back to back along a straight line or in a circular pattern. These banks 33 are not meant to be limiting arrangements as other arrangements for banks 33 of cabinet assemblies 10 are possible.

FIGS. 20, 26, 32, and 36 show pluralities of cabinet assemblies 10 having different display layouts. Each embodiment of cabinet assembly 10*a*, 10*b*, 10*c*, and 10*d* has multiple display layouts (labeled 10*aa*, 10*ab*, 10*ac*, 10*ad*, 10*ae*, 10*bb*, 10*bc*, 10*bd*, 10*be*, 10*bf*, 10*cc*, 10*cd*, 10*ce*, 10*cf*, 10*cg*, 10*dd*, 10*de*, and 10*df* respectively). Display layouts may include more than one display 16, one or more small secondary display 17, and one or more touch-based secondary display 32. The size and position of each display may be different depending on the particular requirements of the cabinet assembly 10 or the hybrid gaming platform 02 within a larger gaming environment. For example, the display 16 may be either in portrait or landscape orientation in order to better account for the particular games that are installed and verified onto the hybrid gaming platform 02. Furthermore, several of the display layouts may also include the incorporation of additional signage 31. Such illuminated signage may be interactive or static depending on the chosen design of the cabinet assembly and the games that are installed and verified onto the hybrid gaming platform 02.

Figure 38:
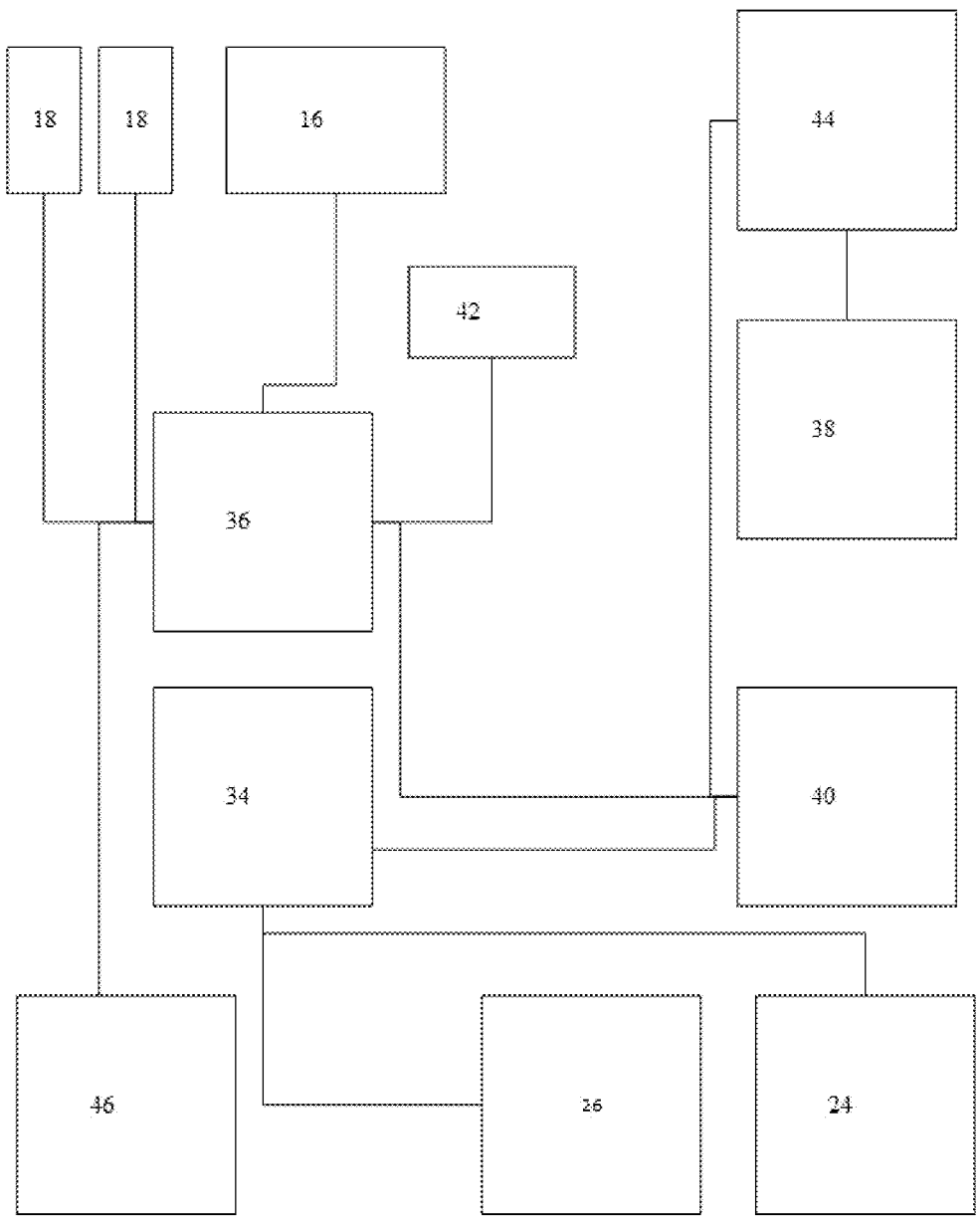
FIG. 38 is another schematic drawing of the hybrid gaming platform.
Figure 39:
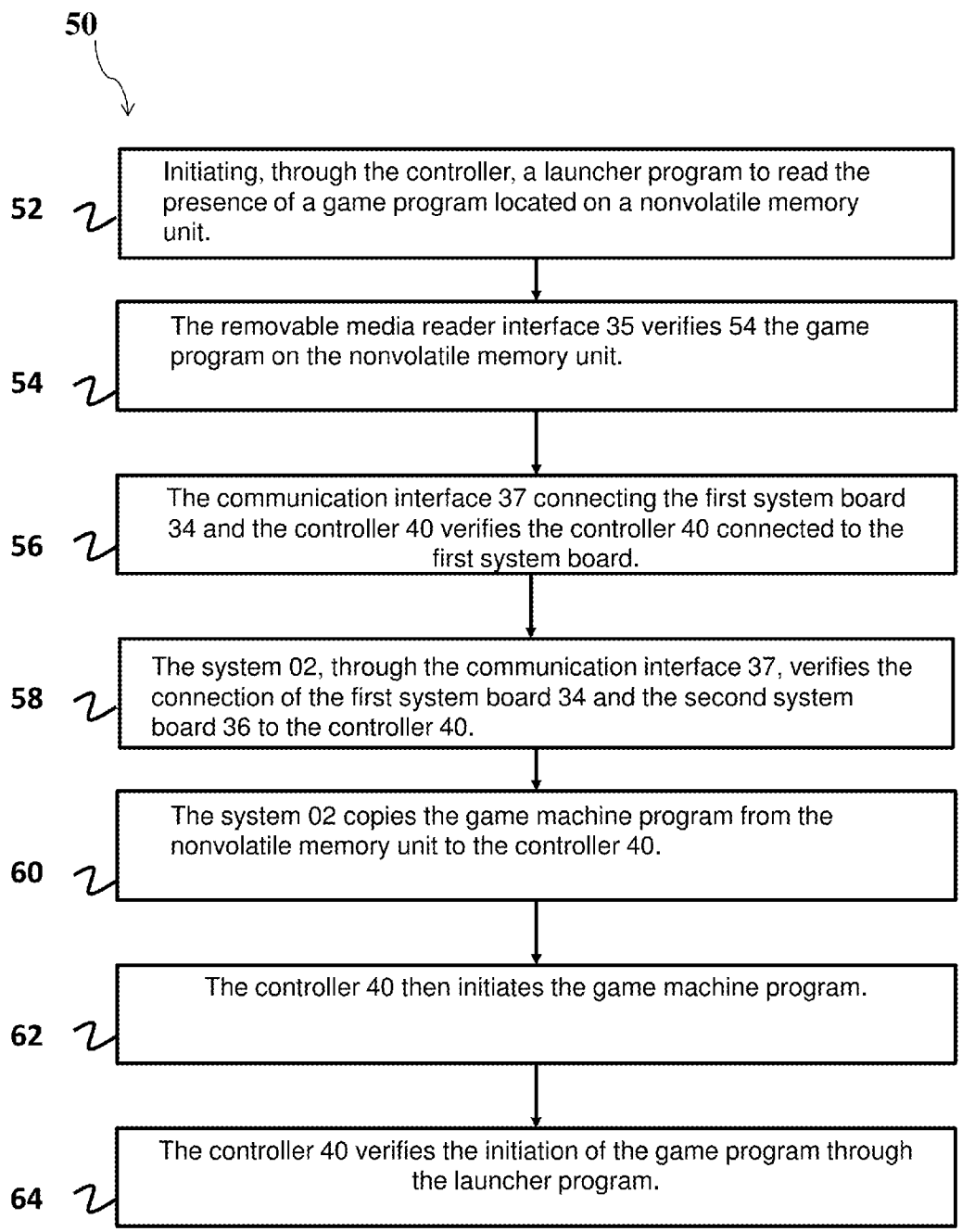
FIG. 39 is a method flowchart of the verification method utilized within the hybrid gaming platform.
Figure 40:
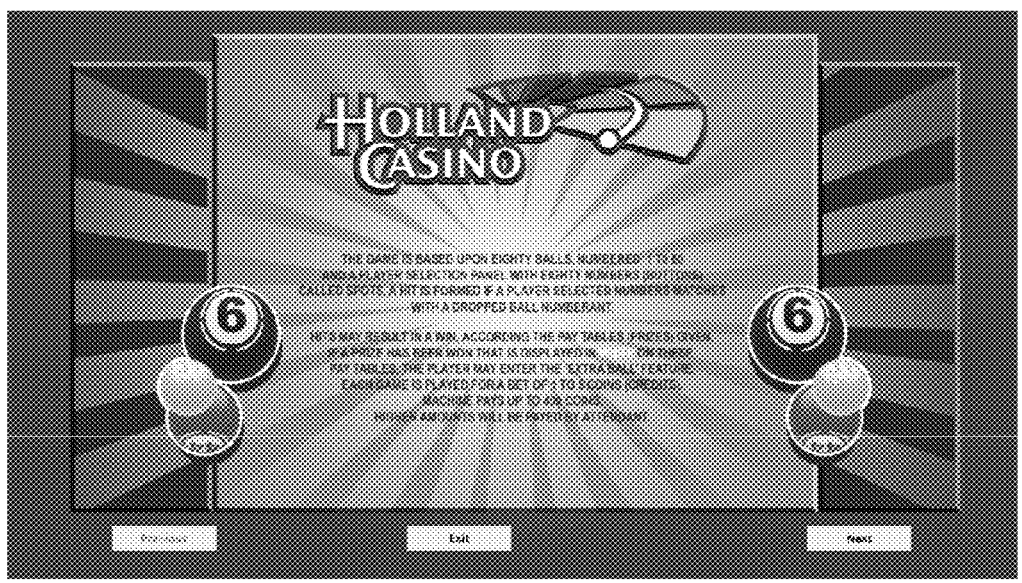
FIG. 40 is a drawing of a representative game screen, according to an embodiment within the present disclosure.
Figure 41:
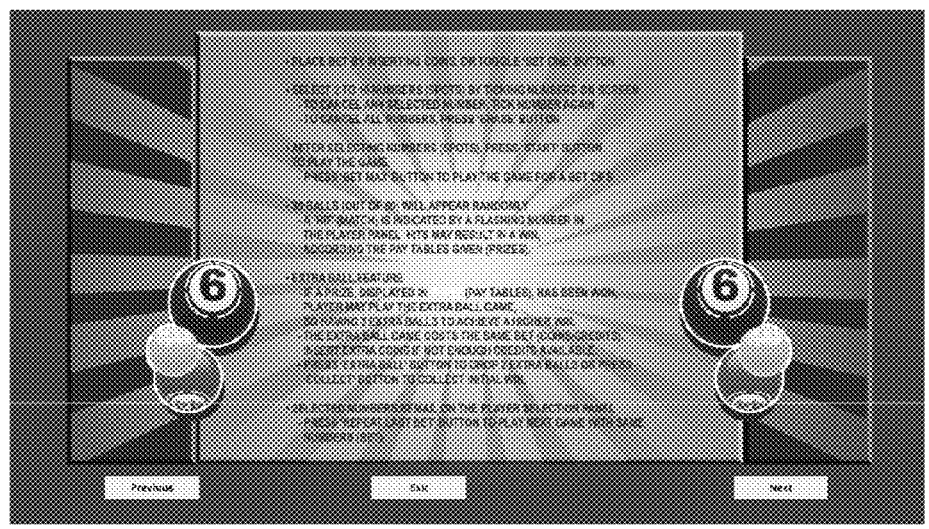
FIG. 41 is another drawing of a representative game screen, according to an embodiment within the present disclosure.
Figure 42:
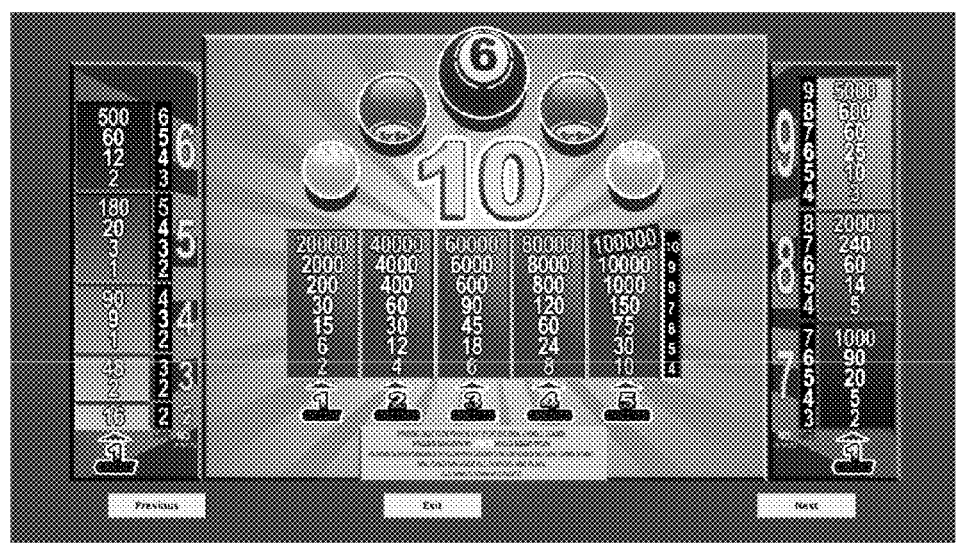
FIG. 42 is another drawing of a representative game screen, according to an embodiment within the present disclosure.
Figure 43:
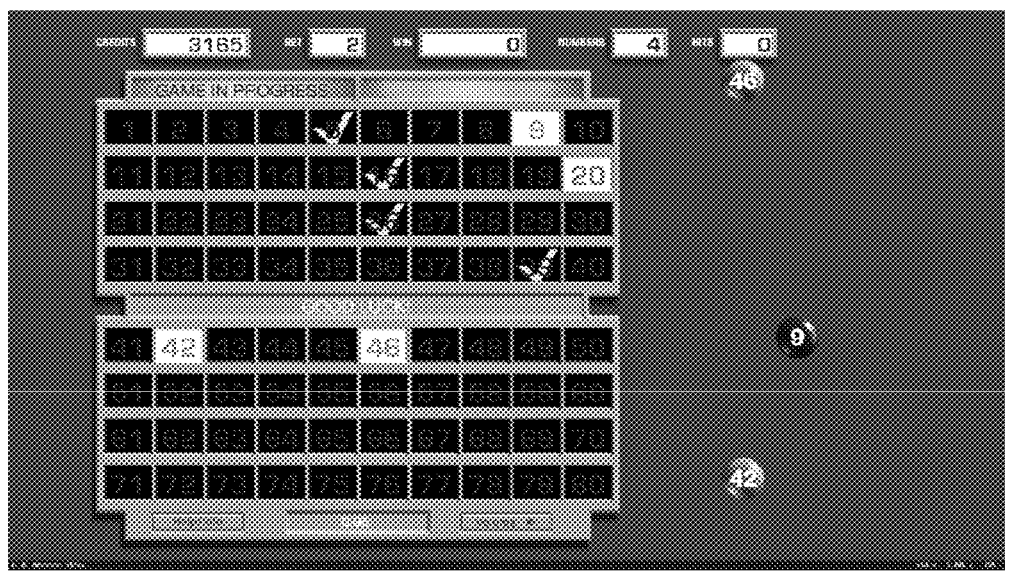
FIG. 43 is another drawing of a representative game screen, according to an embodiment within the present disclosure.
Figure 44:
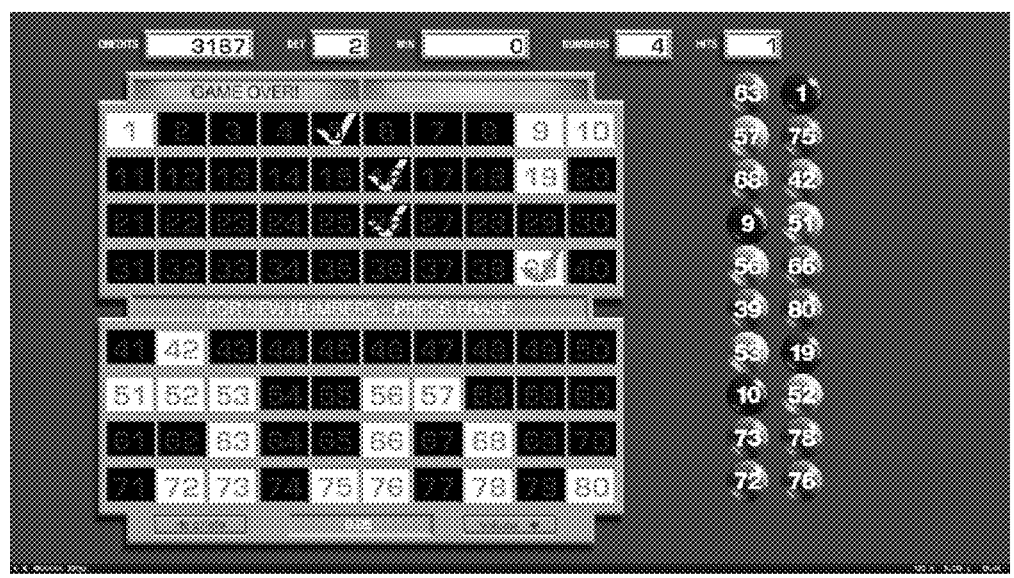
FIG. 44 is another drawing of a representative game screen, according to an embodiment within the present disclosure.

FIG. 38 is a further detailed schematic representation of the hybrid gaming platform 02. All of the components shown in FIG. 38 are contained within or in communication with the cabinet assembly 10. Communication with the cabinet assembly 10 may occur through a network such as, for example, a local area network (LAN), a wide area network (WAN), dial-in-connections, cable modems, wireless modems, T1, T3, fiber, and/or special high-speed Integrated Services Digital Network (ISDN) lines.

One of the main benefits of the hybrid gaming platform 02 is that it incorporates a proprietary software platform and verification method 50 (discussed further below) that is designed to allow the system to work independently or in a server/workstation mode. The hybrid gaming platform 02 can maintain communication between the various gaming components 14/20 and combine stand-alone, server-based, and online game operations into a single platform.

Figure 37:
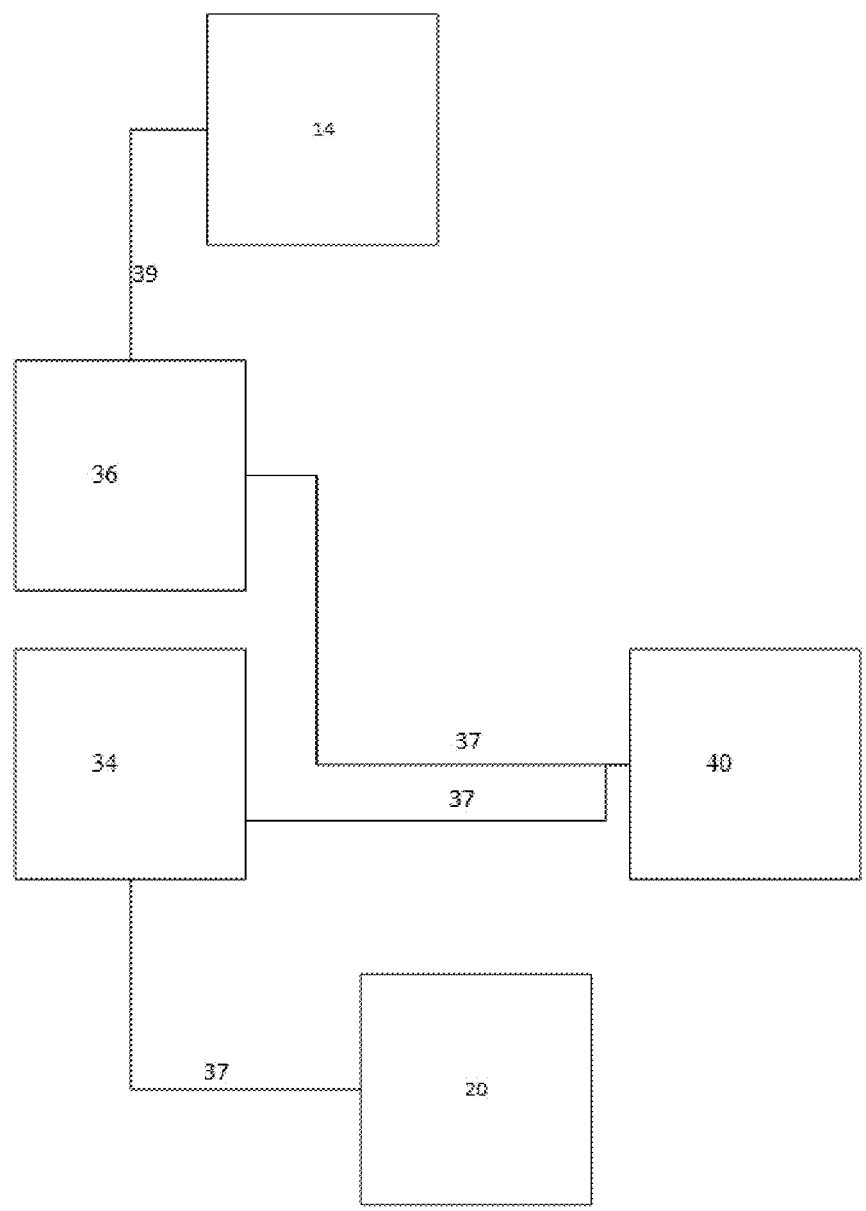
FIG. 37 is a schematic drawing of the hybrid gaming platform.

FIG. 37 shows a schematic of the hybrid gaming platform 02 for use with a controller 40 and a plurality of game machine components 14/20. The system 20 as shown here comprises a first system board 34 and a second system board 36 in communication with the first system board 34. The first system board 34 includes a removable media reader interface 35 (not shown) and a plurality of communication interfaces 37. Both the first system board 34 and the second system board 36 communicate between the plurality of gaming components 14/20 and the controller 40. The removable media reader interface 35 is may be connected to the first system board 34, the second system board 36, or the controller 40. The removable media reader interface is utilized during the game installation and verification method 50 (discussed below). The second system board 36 has at least one communication interface 37 connected to the controller 40 and a plurality of wired connections 39. Each wired connection 39 is connected to at least one game machine component 20. In this embodiment the first system board 34 is configured to receive a request through the at least one communication interface 37, detect a nonvolatile memory unit in the removable media reader interface 35, and transmit a game machine program and a verification code through the at least one communication interface 37. The second system board 36 is configured to receive game signals as a function of the game machine program through that at least one communication interface 37 and send one signal to at least one game component through at least one of the plurality of wired connections 39.

In another illustrated embodiment shown in FIG. 38, the hybrid gaming platform 02 is shown for use with a controller 40 and a plurality of game machine components 14/20. The system includes a first system board 34. The first system board includes a removable media reader interface 35 and a plurality of communication interfaces 37. One of the communication interfaces 37 is connected to a controller 40. The first system board 34 is connected to a plurality of game machine components 14/20 and serves as installation point for a game machine program unto the controller 40. The verification method (discussed further below) also utilizes the removable media reader interface 35. The first system board 34 is configured to receive a request through at least one of the communication interfaces 37, detect a nonvolatile memory unit in the removable media reader interface 35, and transmit a game machine program and a verification code through the at least one communication interface 37.

In another embodiment, the hybrid gaming platform 02 further includes a plurality of interactive game machine components 20. The interactive game machine components 20 are connected to the first system board 34 through the plurality of communication interfaces 37. The interactive game machine components 20 are configured to emit signals through the plurality of communications interfaces 37 and transmit the signals back through the plurality of communication interfaces 37.

In another embodiment the removable media reader interface 35 is a nonvolatile media card reader. The nonvolatile media may be a secure digital (SD) type media card, but other types of nonvolatile media may be used in conjunction with a compatible removable media reader interface 35. Examples include, but are not limited to, pc card, Compact-Flash I and II, SmartMedia, MemoryStick, Multimedia Card (MMC), mini/micro SD, xD-Card, and USB-based flash drives. The removable media ensures that game machine programs may be generated away from the installed location of the hybrid gaming platform 02 and then validated and installed onto the hybrid gaming platform 02 through the removal media reader interface 35.

The hybrid gaming platform 02 also includes a second system board 36. The second system board 36 has at least one communication interface 37 connected to the controller 40 and a plurality of wired connections 39. Each wired connection 39 is connected to at least one game machine component 14/20. The controller 40 is connected to both the first system board 34 and the second system board 36. The controller 40 serves as part of the game machine program verification process and then serves to run to the game machine program upon completion of the verification process.

The communication interface 37 in this embodiment is a series of universal serial bus (USB) connections, but any bi-directional communication standard can be utilized between the controller 40 and the first system board 34 and the second system board 36. The second system board 36 is also connected to a meterboard 42. The meterboard 42 serves to count the number of game play instances and currency inputs placed by a player once a hybrid gaming platform 02 has a verified game machine program installed. This may be used for regulatory and diagnostic purposes by the system operators. The second system board 36 is also connected to the display 16 and the lighting strips 18 by way of the plurality of wired connections 39.

In another embodiment, the plurality of wired connections 39 may include unshielded twisted pair connections. Other types of wired connections may also be used.

Both the first system board 34 and the second system board 36 are connected to a power supply unit 38. This power supply unit 38 may also serve to power the additional game machine components 14/20 within the hybrid gaming platform 02. There are also a series of audio components 44 that are connected to the controller 40 and utilized by a verified and installed game machine program.

FIG. 38 is a method flowchart of the verification method 50 utilized by hybrid gaming platform 02. The method 50 of hybrid gaming platform 02 utilizes the controller 40 and the plurality of game machine components 14/20. The method 50 begins by initiating 52, through the controller 40, a launcher program to read the presence of a game program located on a nonvolatile memory unit. Then, the removable media reader interface 35 verifies 54 the game program on the nonvolatile memory unit.

The communication interface 37 connecting the first system board 34 and the controller 40 verifies 56 the controller 40 connected to the first system board. The hybrid gaming platform 02, through the communication interface 37, verifies 58, the connection of the first system board 34 and the second system board 36 to the controller 40. This ensures that all the hybrid gaming platform 02 components are connected for the game machine program to function properly.

Upon verification of the connection of the first 34 and the second 36 system boards to the controller, the hybrid gaming platform 02 copies 60, the game machine program from the nonvolatile memory unit to the controller 40. The controller 40 then initiates 62, the game machine program. Finally, the controller 40 verifies 64 the initiation of the game program through the launcher program. In one embodiment, the controller 40 verifies that the game machine program runs as a subroutine of the initial launcher program. It should be noted that if any of these verifications fail, the entire process halts on the hybrid gaming platform 02.

In another embodiment, the game program includes a plurality of game program files and the method 50 further includes the steps of calculating a hash value for each of the game program files and comparing the calculated hash value for each game program file against a predetermined validation hash value. Additional validation methods may also be used in order to process to the method 50.

In another embodiment, the first 34 and second 36 system boards include a plurality of identifying information and the step of verifying the connection of the first 34 and second 36 system boards to the controller 40 further includes verifying, through the controller 40, the identifying information against a plurality of predetermined information.

In another embodiment the game program further includes a plurality of game data and the step of copying 60, the game machine program, from the nonvolatile memory unit, further includes copying the game data.

Finally, in another embodiment, the verification of the game program through the launcher program involves integrative use of both programs by the controller.

FIGS. 40-44 show representative displays of a game installed on the hybrid gaming platform 02. Once installed a game may utilized all the various gaming components 14/20 in order to provide a fully functional game experience through the hybrid gaming platform 02. All the game screen may be displayed through either a display 16 or a touch-based secondary display 32. All of the game screens 40-44 show interactive touch elements 66, which can either function as direct touch points on the touch-based secondary display 32 or as indicators for a plurality of interactive gaming components 20. This particular embodiment is in the form of a keno game, but additional wager-based games may also be installed and used on the hybrid gaming platform 02 including slot, video poker, etc. The functionality of the game shown in FIGS. 39-50 is after the game is installed and verified through method 50.

Figure 53:
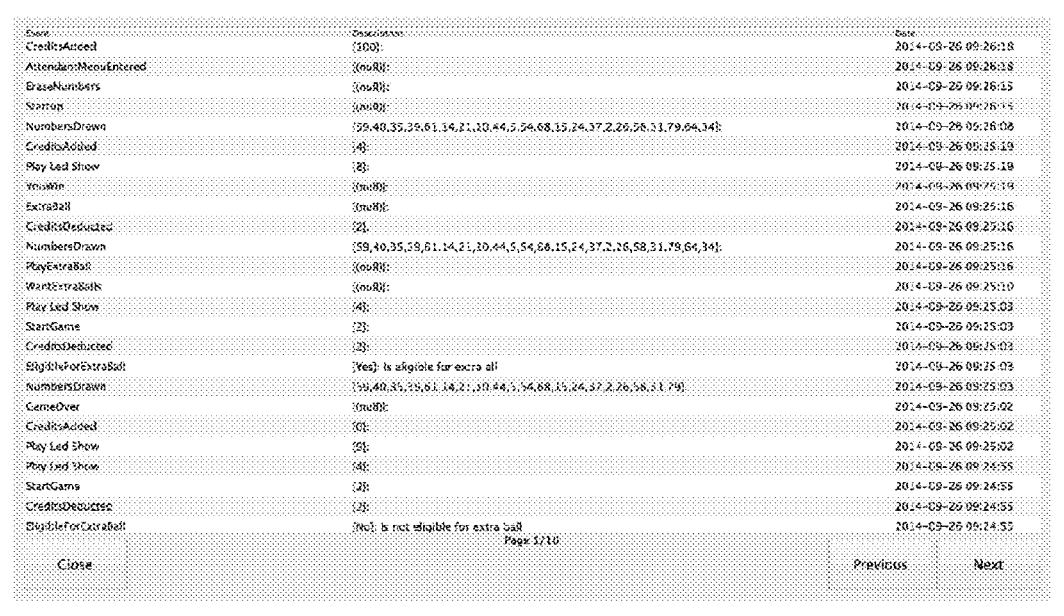
Figure 54:
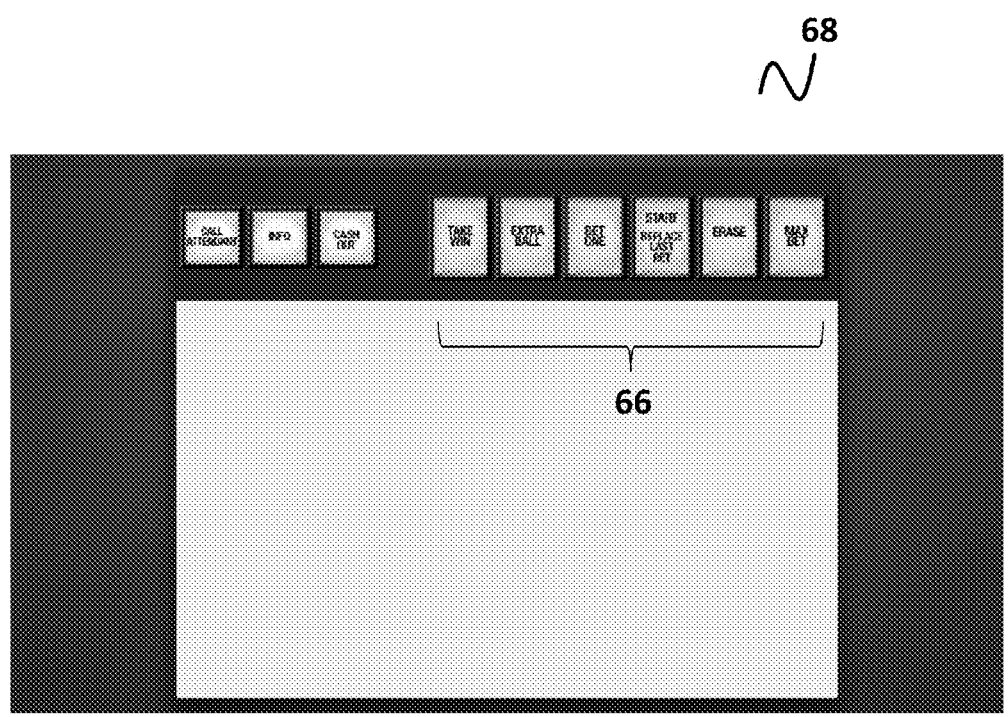
FIG. 54 is a representative drawing of an interactive touchscreen display, according to an embodiment within the present disclosure.

FIGS. 45-54 demonstrate various screenshots of the touch-based secondary display 32 utilized within the hybrid gaming platform 02. FIGS. 45-53 demonstrate various service screen utilized to provide diagnostics to hybrid gaming platform 02. Diagnostics include accounting, machine setup, game setup, and verification through method 50. FIG. 54 demonstrates a touch-based game interface used by a player through the touch-based secondary display 32. Additional game elements may be presented through the touch-based secondary display depending on the game that is installed and verified on the hybrid gaming platform 02.

Figure 45:
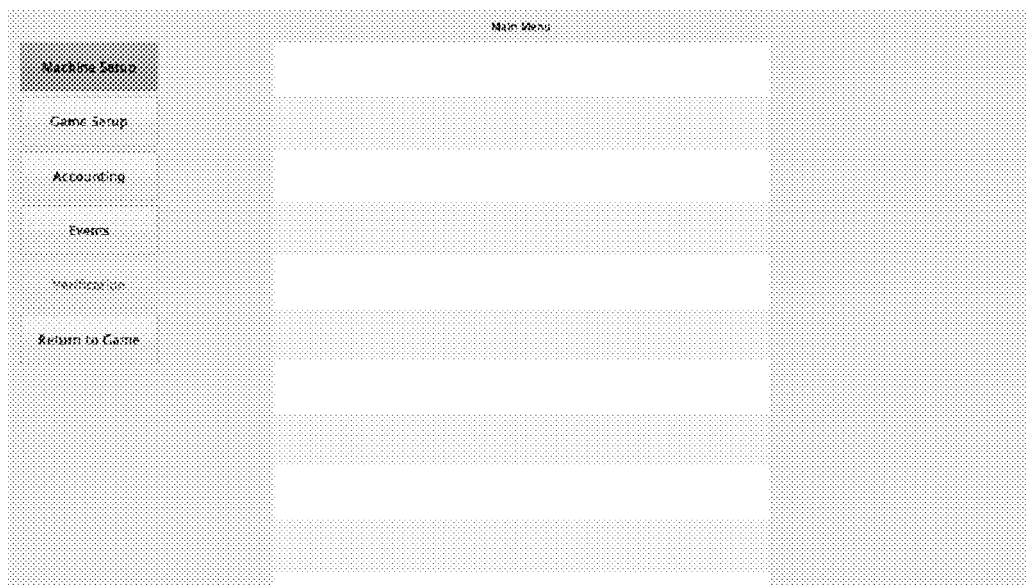
FIG. 45 is a representative drawing of an interactive touchscreen display, according to an embodiment within the present disclosure.

FIG. 45 demonstrates a MAIN MENU diagnostic screen. Within this screen the system operator has the options of MACHINE SETUP, GAME SETUP, ACCOUNTING, EVENTS, and VERIFICATION. The RETURN TO GAME options serves to exit the MAIN MENU screen and return to the installed and verified game on the hybrid gaming platform 02.

Figure 46:
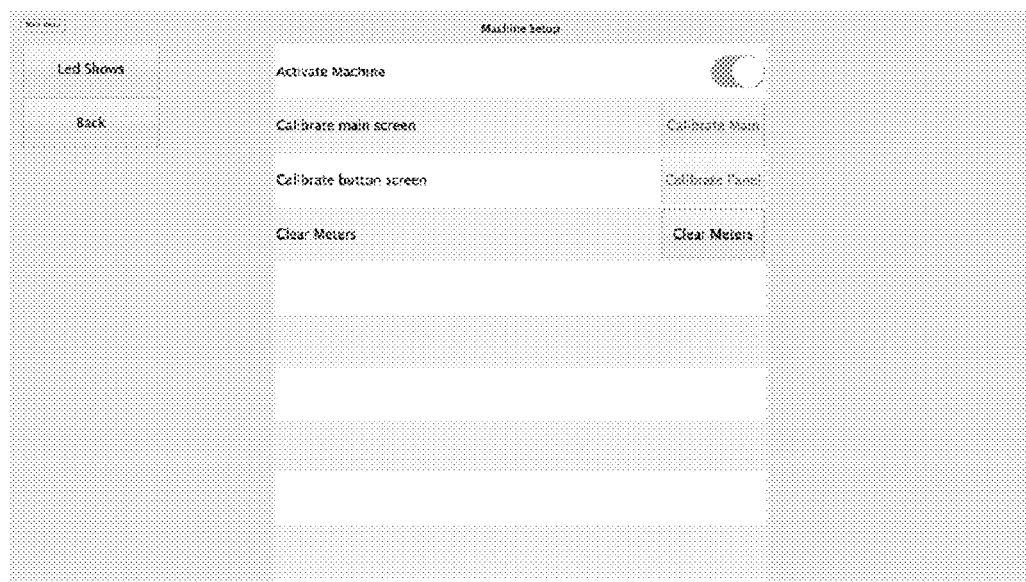
FIG. 46 is a representative drawing of an interactive touchscreen display, according to an embodiment within the present disclosure.
Figure 47:
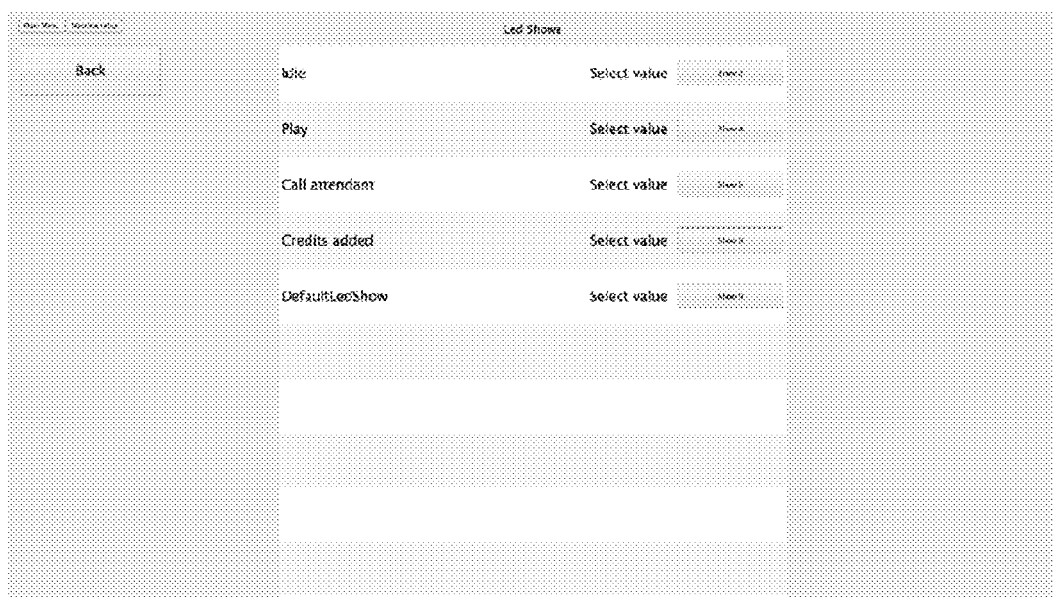
FIG. 47 is a representative drawing of an interactive touchscreen display, according to an embodiment within the present disclosure.

FIG. 46 shows the MACHINE SETUP screen. This screen allows for the configuration and calibration of the plurality of gaming components 14/20. This includes the display 16 calibration and the touch-based secondary display 32 calibration. An additional option allows an operator to clear the meterboard 42 within the hybrid gaming platform 02. FIG. 47 demonstrates all the various options for the configuration of the lighting strips and RGB LED components 18. All options (IDLE, PLAY, CALL ATTENDANT, CREDITS ADDED, DEFAULTED SHOW) have adjustable values that may be adjusted in order to vary the appearance of the hybrid gaming platform 02.

Figure 48:
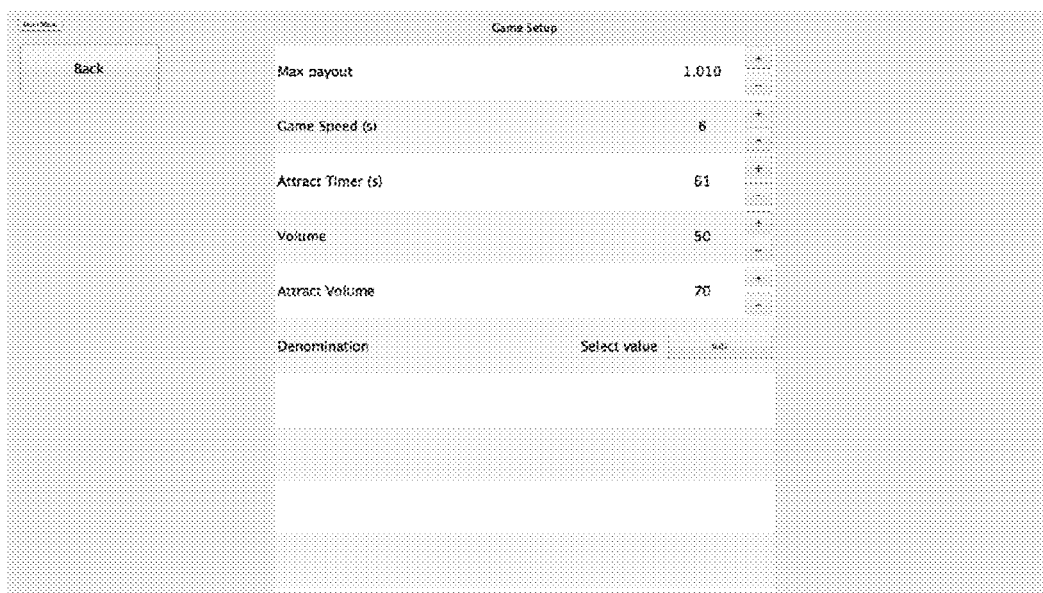
FIG. 48 is a representative drawing of an interactive touchscreen display, according to an embodiment of the present invention.

FIG. 48 shows the GAME SETUP screen. This screen has a plurality of game specific metrics and options that can be adjusted. Such options include the max payout by the hybrid gaming platform 02, the game speed, the attract timer, the main volume setting, the attract volume, and the standard denomination of the currency used by the system. While these options are established as game-agnostic options, a game may also import particular game options that can then be modified by the operator once a game program is installed and verified onto the hybrid gaming platform 02.

Figure 49:
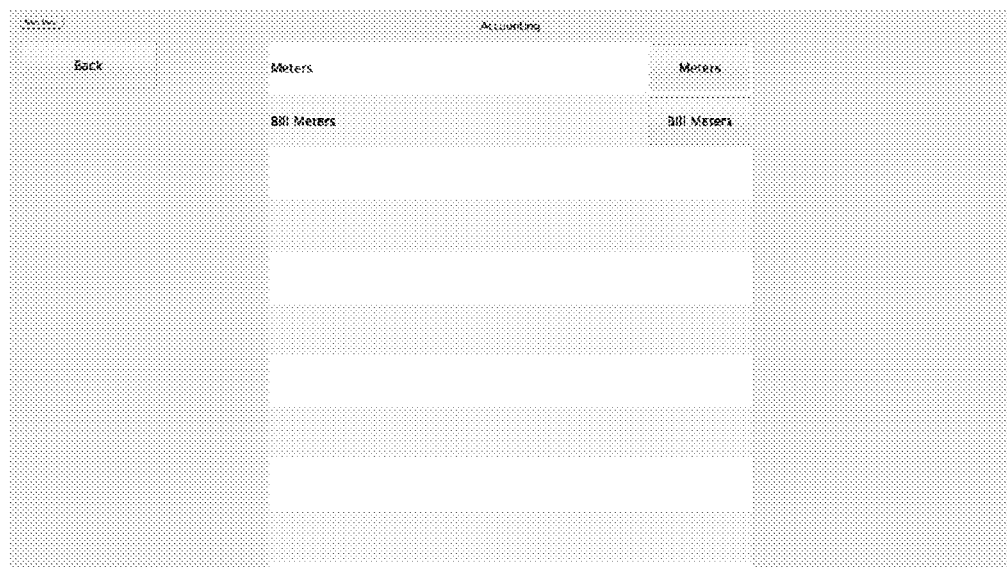
FIG. 49 is a representative drawing of an interactive touchscreen display, according to an embodiment of the present invention.
Figure 50:
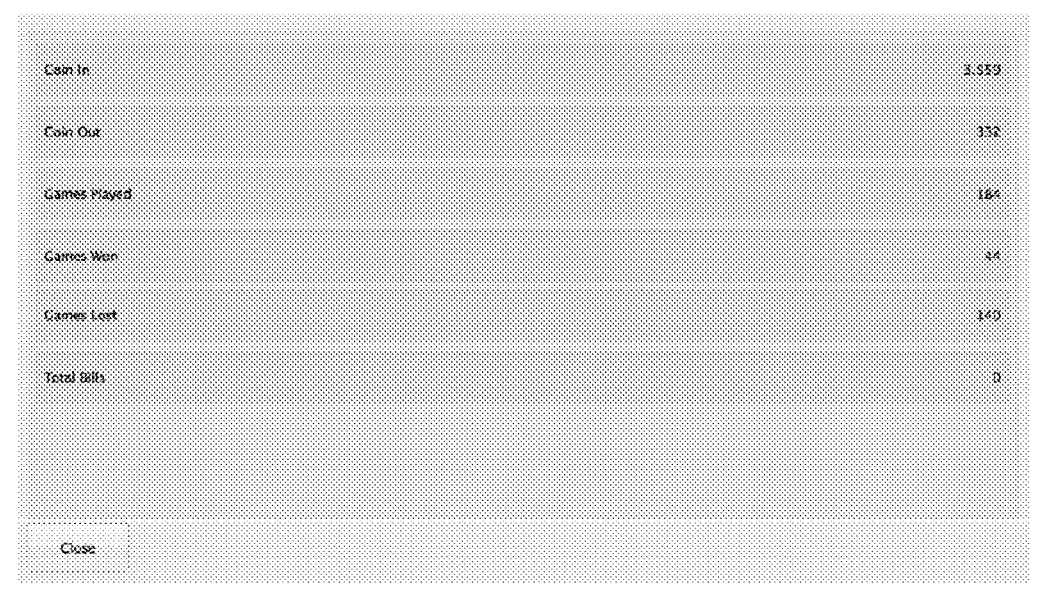

FIG. 49 shows the ACCOUNTING main screen. In this embodiment this is limited to allowing an operator to view the various meters on the metersboard 42 (for example the bill meters screen as FIG. 50). An installed and verified game program may also import additional accounting metrics required for the functionality of a particular game within the hybrid gaming platform 02.

Figure 51:
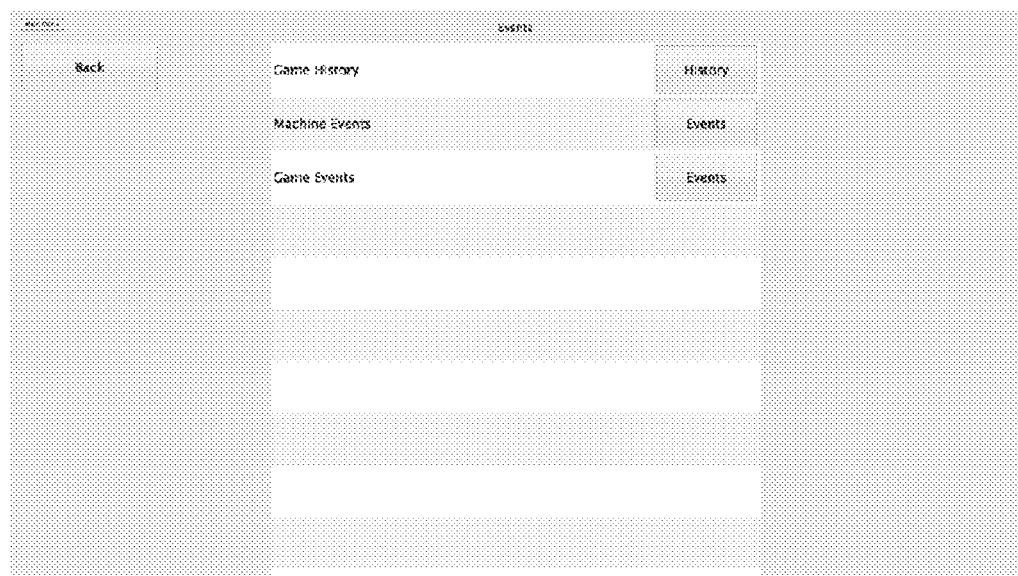
FIG. 51 is a representative drawing of an interactive touchscreen display, according to an embodiment within the present disclosure.

FIG. 51 is the EVENTS main screen. Here the hybrid gaming platform 02 allows an operator to view the Game History, Machine Events, and Game Events associated with the installed and verified game program on the hybrid gaming platform 02. FIGS. 52 and 53 show the Machine Events and the Game Events respectively. Both screens allow an operator to view all of the actions taken by the system over the course of game play on the hybrid gaming platform 02.

FIG. 54 demonstrates a touch-based game interface 68 used by a player through the touch-based secondary display 32. Along the top of the display there is a plurality of touch-based elements 66 that allow the player to interact with the game during gameplay. These functions include CALL ATTENDANT, INFO, CASH OUT, TAKE WIN, EXTRA BALL, BET ONE, START/REPLACE LAST BEST, ERASE, and MAX BET. These particular touch-based elements are based on the example keno game discussed above. Other touch-based elements 66 and options are possible given the game that is installed and verified onto the hybrid gaming platform 02.

Elements of the Embodiments Generally

Exemplary embodiments of these systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the system and method as described herein.

The controller 40 and likewise any computing device, or computer, such as described herein, may include at least one or more processors or processing units and a system memory. The gaming controller may typically also include at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments within the disclosure illustrated and described herein is not essential, unless otherwise specified. That is, the operations described herein may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the disclosure.

In some embodiments, a processor, as described herein, includes any programmable system including systems and microcontrollers, complex instruction set circuits (CISC), reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to, Oracle® Databases, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples within this disclosure, including the best mode, and also to enable any person skilled in the art to practice the subject matter within the disclosure, including making and using any devices or systems and performing any incorporated methods. The patentable scope of the invention is defined by the claims, and may include other examples that occur to those skilled in the art. Other aspects and features within the present disclosure may be obtained from a study of the drawings, the specification, and the appended claims. The subject matter of the present disclosure may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments within the disclosure may be shown in some drawings and not in others, this is for convenience only. In accordance with the principles of the subject matter within the disclosure, any feature of a drawing may be referenced and/or claimed in combination with any feature of any other drawing.

What is claimed is:

1. A hybrid gaming platform for use with a controller and a plurality of game machine components, said hybrid gaming platform comprising:
   a first system board, the first system board having;
   a removable media reader interface, and
   a plurality of communication interfaces, at least one communication interface connected to the controller; and
   a second system board in communication with the second system board, the second system board having:
   at least one communication interface, the at least one communication interface connected to the controller, and a plurality of wired connections, each connection connected to at least one game machine component,
   the first system board configured to:
      receive a request through the at least one communication interface,
      detect a nonvolatile memory unit in the removable media reader interface, the nonvolatile memory unit having a game machine program stored thereon, and
      read the game machine program from the nonvolatile memory and transmit the game machine program and a verification code through the at least one communication interface,
   the second system board configured to:
      receive game signals as a function of the game machine program through the at least one communication interface and send at least one signal to at least one game component through at least one of the plurality of wired connections.

2. The hybrid gaming platform of claim 1, wherein the removable media read interface includes a nonvolatile media card reader.

3. The hybrid gaming platform of claim 1, wherein at least one of the communication interfaces is a universal serial bus interface.

4. The hybrid gaming platform of claim 1, wherein at least one of the wired connections is an unshielded twisted pair connection.

5. The hybrid gaming platform of claim 1, wherein the system further includes a plurality of interactive game machine components, said interactive game machine components connected to the first system board through the plurality of communication interfaces, the interactive game machine components configured to emit signals through the plurality of communications interfaces and transmit the signals back through the plurality of communication interfaces.

6. The hybrid gaming platform of claim 1, wherein the platform further includes a desktop computer, the desktop computer configured to the work as the controller with the hybrid gaming platform.

7. The hybrid gaming platform of claim 1, wherein one of the gaming components includes a tablet computer, the first system board configured to receive a signal from the table computer through the at least one communication interface.

8. A method of using a hybrid gaming platform for use with a controller and a plurality of game machine components, said hybrid gaming platform including a first system board and a second system board in communication with the first system board, the first system board having a removable media reader interface, and a plurality of communication interfaces, at least one communication interface connected to the controller, the second system board having at least one communication interface, the at least one communication interface connected to the controller, and a plurality of wired connections, each connection connected to at least one game machine component, the method comprising the steps of:
   initiating, through the controller, a launcher program to read the presence of a game program stored on a nonvolatile memory unit;
   verifying, through the removable media reader interface, the game program on the nonvolatile memory unit;
   verifying, through the at least one communication interface, the controller connected to the first system board;
   verifying, through the at least one communication interface, the connection of the first and second system board to the controller;
   reading the game machine program from the nonvolatile memory and copying the game program from the nonvolatile memory unit to the controller;
   initiating, through the controller, the game program; and
   verifying, through the controller, the initiation of the game program through the launcher program.

9. The method of claim 8, the game program including a plurality of game program files and wherein the step of verifying the game program further includes the steps of:
   calculating a hash value for each of the game program files; and
   comparing the calculated hash value for each game program file against a predetermined validation hash value.

10. The method of claim 8, wherein the first and second system boards including a plurality of identifying information and wherein the step of verifying the connection of the first and second system boards to the controller further includes verifying, through the controller, the identifying information against a plurality of predetermined information.

11. The method of claim 8, the game program including a plurality of game data and wherein the step of copying the game program from the nonvolatile memory unit further includes copying the game data.

12. The method of the claim 9, wherein the verification of the game program through the launcher program involves integrative use of both programs by the controller.

13. A non-transitory information recording medium containing a computer readable program that functions as a hybrid gaming platform for use with a controller and a plurality of game machine components, said hybrid gaming platform comprising:
  a first system board, the first system board having a removable media reader interface, and a plurality of communication interfaces, at least one communication interface connected to the controller; and
  a second system board in communication with the first system board, the second system board having at least one communication interface, the at least one communication interface connected to the controller, and a plurality of wired connections, each connection connected to at least one game machine component,
  the first system board configured to:
    receive a request through the at least one communication interface,
    detect a nonvolatile memory unit in the removable media reader interface, the nonvolatile memory unit having a game machine program stored thereon,
    read the game machine program from the nonvolatile memory and transmit the game machine program and a verification code through the at least one communication interface, the second system board configured to:
    receive game signals as a function of the game machine program through the at least one communication interface and send at least one signal to at least one game component through at least one of the plurality of wired connections.

14. The non-transitory information recording medium of claim 13, wherein the system further includes a desktop computer, the desktop computer configured to the work as the controller with the hybrid gaming platform.

15. The non-transitory information recording medium of claim 13, wherein one of the gaming components includes a tablet computer, the first system board configured to receive a signal from the table computer through the at least one communication interface.

16. A hybrid gaming platform comprising:
  a desktop computer;
  a tablet display;
  a first system board, the first system board having:
  a removable media reader interface, and
  a plurality of communication interfaces, at least one communication interface connected to the desktop computer; and
  a second system board in communication with the second system board, the second system board having:
  at least two communication interfaces, one communication interface connected to the desktop computer, and another connection connected to the tablet computer,
  the first system board configured to:
    receive a request through the at least one communication interface,
    detect a nonvolatile memory unit in the removable media reader interface, the nonvolatile memory unit having a game machine program stored thereon, and
    read the game machine program from the nonvolatile memory and transmit the game machine program and a verification code through the at least one communication interface,
  the second system board configured to:
    receive game signals as a function of the game machine program through the at least one communication interface and send at least one signal to the tablet computer.

* * * * *